United States Patent
Chen et al.

(10) Patent No.: US 12,034,193 B2
(45) Date of Patent: Jul. 9, 2024

(54) FLUORINATED COPOLYMER AND COMPOSITIONS AND ARTICLES INCLUDING THE SAME

(71) Applicant: 3M INNOVATIVE PROPERTIES COMPANY, St. Paul, MN (US)

(72) Inventors: Lisa P. Chen, St. Paul, MN (US); Gregg D. Dahlke, St. Paul, MN (US); Denis Duchesne, Woodbury, MN (US); Klaus Hintzer, Kastl (DE); Matthew J. Lindell, Woodbury, MN (US); Sean M. Smith, Woodbury, MN (US); Arne Thaler, Emmerting (DE); Michael A. Yandrasits, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 17/782,193

(22) PCT Filed: Dec. 18, 2020

(86) PCT No.: PCT/US2020/065867
§ 371 (c)(1),
(2) Date: Jun. 3, 2022

(87) PCT Pub. No.: WO2021/127346
PCT Pub. Date: Jun. 24, 2021

(65) Prior Publication Data
US 2023/0056130 A1 Feb. 23, 2023

Related U.S. Application Data

(60) Provisional application No. 62/951,469, filed on Dec. 20, 2019.

(51) Int. Cl.
*H01M 8/1039* (2016.01)
*H01M 4/88* (2006.01)
*H01M 4/90* (2006.01)
*H01M 8/1004* (2016.01)

(52) U.S. Cl.
CPC ......... *H01M 8/1039* (2013.01); *H01M 4/881* (2013.01); *H01M 4/9008* (2013.01); *H01M 8/1004* (2013.01); *H01M 2300/0082* (2013.01)

(58) Field of Classification Search
CPC .............. H01M 8/1039; H01M 4/881; H01M 2300/0082
See application file for complete search history.

(56) References Cited

U.S. PATENT DOCUMENTS

| 2,559,752 A | 7/1951 | Berry et al. |
| 3,282,875 A | 11/1966 | James et al. |
| 3,718,627 A | 2/1973 | Grot |

(Continued)

FOREIGN PATENT DOCUMENTS

| JP | 6470444 A | 3/1989 |
| JP | 6470445 A | 3/1989 |

(Continued)

OTHER PUBLICATIONS

Abe, "An Alternative New Route to Perfluorovinylamines. Pyrolysis of an Alkali Metal Salt of Perfluoro(3-dialkylamino-propionic acids)", Chemistry Letters, 1989, vol. 18, No. 5, pp. 905-908.
Gronwald, "Synthesis of Difluoroethyl Perfluorosulfonate Monomer and Its Application"; Journal of Fluorine Chemistry, Jun. 2008, vol. 129, No. 6, pp. 535-540.
Hayakawa, "New Perfluoropolymers Bearing Dialkylamino Groups as Side Chains", Polymer, 1995, vol. 36, No. 14, pp. 2807-2812.
International Search Report for PCT Application No. PCT/US2020/065867, mailed on Mar. 19, 2021, 5 pages.

(Continued)

*Primary Examiner* — Milton I Cano
*Assistant Examiner* — Albert Michael Hilton
(74) *Attorney, Agent, or Firm* — Julie Lapos-Kuchar; Kathleen Gross

(57) ABSTRACT

The copolymer includes divalent units represented by formula —[CF$_2$—CF$_2$]—, at least one divalent unit represented by formula (I): and at least one divalent unit independently represented by formula (II): A is —N(RF$^a$)$_2$ or a is non-aromatic, 5- to 8-membered, perfluorinated ring comprising one or two nitrogen atoms in the ring and optionally comprising at least one oxygen atom in the ring, each RFa is independently linear or branched perfluoroalkyl having 1 to 8 carbon atoms and optionally interrupted by at least one catenated O or N atom, each Y is independently —H or —F, with the proviso that one Y may be —CF$_3$, h is 0, 1, or 2, each i is independently 2 to 8, and j is 0, 1, or 2. A catalyst ink and polymer electrolyte membrane including the copolymer are also provided.

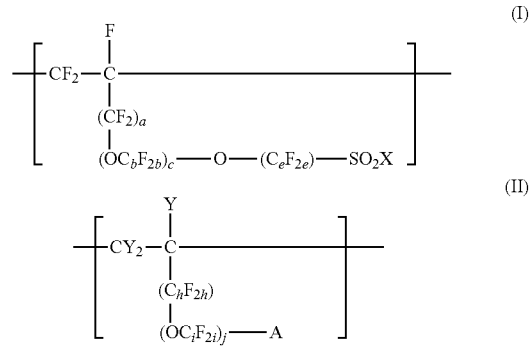

20 Claims, No Drawings

(56) References Cited

U.S. PATENT DOCUMENTS

| | | | |
|---|---|---|---|
| 3,970,709 A * | 7/1976 | Owston | C08K 5/09 525/100 |
| 4,267,364 A | 5/1981 | Grot et al. | |
| 4,273,729 A | 6/1981 | Krespan | |
| 4,349,650 A | 9/1982 | Krespan | |
| 4,423,197 A | 12/1983 | Behr | |
| 4,621,116 A | 11/1986 | Morgan | |
| 4,940,525 A * | 7/1990 | Ezzell | B32B 27/322 204/252 |
| 4,962,292 A | 10/1990 | Aoki | |
| 4,985,556 A | 1/1991 | Abe et al. | |
| 5,182,342 A | 1/1993 | Feiring et al. | |
| 5,285,002 A | 2/1994 | Grootaert | |
| 5,378,782 A | 1/1995 | Grootaert | |
| 5,442,097 A | 8/1995 | Obermeier et al. | |
| 5,463,021 A | 10/1995 | Beyer et al. | |
| 6,255,536 B1 | 7/2001 | Worm et al. | |
| 6,294,627 B1 | 9/2001 | Worm et al. | |
| 6,387,570 B1 | 5/2002 | Nakamura et al. | |
| 6,388,139 B1 | 5/2002 | Resnick | |
| 6,429,258 B1 | 8/2002 | Morgan et al. | |
| 6,613,941 B1 | 9/2003 | Felix et al. | |
| 6,624,328 B1 | 9/2003 | Guerra et al. | |
| 6,706,193 B1 | 3/2004 | Burkard et al. | |
| 6,780,544 B2 | 8/2004 | Noh | |
| 6,794,550 B2 | 9/2004 | Hintzer et al. | |
| 7,018,541 B2 | 3/2006 | Hintzer et al. | |
| 7,214,740 B2 | 5/2007 | Lochhaas et al. | |
| 7,304,101 B2 | 12/2007 | Hintzer et al. | |
| 7,671,112 B2 | 3/2010 | Hintzer et al. | |
| 8,227,139 B2 | 7/2012 | Watakabe | |
| 8,367,267 B2 | 2/2013 | Frey et al. | |
| 8,470,943 B2 | 6/2013 | Watakabe et al. | |
| 8,628,871 B2 | 1/2014 | Frey et al. | |
| 2002/0160272 A1 | 10/2002 | Tanaka et al. | |
| 2004/0107869 A1 | 6/2004 | Velamakanni et al. | |
| 2006/0199898 A1 | 9/2006 | Funaki et al. | |
| 2006/0223924 A1 | 10/2006 | Tsuda et al. | |
| 2006/0281946 A1 | 12/2006 | Morita et al. | |
| 2007/0015865 A1 | 1/2007 | Hintzer et al. | |
| 2007/0060699 A1 | 3/2007 | Tsuda et al. | |
| 2007/0117915 A1 | 5/2007 | Funaki et al. | |
| 2007/0142513 A1 | 6/2007 | Tsuda et al. | |
| 2007/0142541 A1 | 6/2007 | Hintzer et al. | |
| 2010/0311906 A1 | 12/2010 | Lavallee et al. | |
| 2013/0022894 A1 * | 1/2013 | Zou | C08J 5/2281 429/494 |
| 2013/0245219 A1 | 9/2013 | Perry et al. | |
| 2013/0252134 A1 | 9/2013 | Takami et al. | |
| 2013/0253157 A1 | 9/2013 | Takami et al. | |
| 2014/0130713 A1 | 5/2014 | Costello et al. | |
| 2017/0183435 A1 | 6/2017 | Ino et al. | |
| 2018/0016375 A1 * | 1/2018 | Duchesne | H01B 3/445 |

FOREIGN PATENT DOCUMENTS

| | | | | |
|---|---|---|---|---|
| JP | 2011040363 A | 2/2011 | | |
| WO | 2000024709 A2 | 5/2000 | | |
| WO | 2017106119 A1 | 6/2017 | | |
| WO | WO-2017155686 A1 * | 9/2017 | | C07C 217/26 |
| WO | 2018211457 A2 | 11/2018 | | |
| WO | 2019055799 A1 | 3/2019 | | |

OTHER PUBLICATIONS

Kongkanand, "The Priority and Challenge of High-Power Performance of Low Platinum Proton-Exchange Membrane Fuel Cells", The Journ, al of Physical Chemistry Letters, 2016, vol. 7, No. 7, pp. 1127-1137.

Scheirs, Modern Fluoropolymers, 241, (1997).

Uematsu, "Synthesis of Novel Perfluorosulfonamide Monomers and Their Application", Journal of Fluorine Chemistry, 2006, vol. 127, No. 8, pp. 1087-1095.

\* cited by examiner

FLUORINATED COPOLYMER AND COMPOSITIONS AND ARTICLES INCLUDING THE SAME

CROSS-REFERENCE TO RELATED APPLICATION

This application claims priority to U.S. Provisional Application No. 62/951,469, filed Dec. 20, 2019, the disclosure of which is incorporated by reference in its entirety herein.

BACKGROUND

Copolymers of tetrafluoroethylene and polyfluorovinyloxy monomers including sulfonyl fluoride pendant groups have been made. See, for example, U.S. Pat. No. 3,282,875 (Connolly), U.S. Pat. No. 3,718,627 (Grot), and 4,267,364 (Grot). Copolymers of fluorinated olefins and polyfluoroallyloxy sulfonyl fluorides have been made. See, for example, U.S. Pat. No. 4,273,729 (Krespan) and U.S. Pat. No. 8,227,139 (Watakabe), and International Pat. Appl. Pub. No. WO 00/24709 (Farnham et al.). Hydrolysis of the sulfonyl fluoride of these copolymers to form an acid or acid salt provides ionic copolymers, which are also called ionomers.

Certain recently disclosed ionomers are said to have high oxygen permeability. See, for example, U.S. Pat. Appl. Pub. Nos. 2017/0183435 (Ino), 2013/0253157 (Takami), 2013/0245219 (Perry), and 2013/0252134 (Takami), and U.S. Pat. No. 8,470,943 (Watakabe).

SUMMARY

Membrane electrode assemblies useful in solid polymer electrolyte fuel cells include electrode catalyst layers including a catalyst (e.g., platinum) and an ionomer. Since the catalysts (e.g., platinum) are typically expensive, decreasing the amount of catalyst can be desirable. For an ionomer used in the electrode, high oxygen permeability is desirable to minimize resistance. In the ionic catalyst layer, it is desirable to have a high oxygen permeability without lowering the ionic conductivity.

The copolymers of the present disclosure include monomer units including nitrogen-containing compounds in addition to tetrafluoroethylene and sulfonyl group-containing monomer units. Inclusion of such nitrogen-containing compounds can typically provide high oxygen permeation ionomers for electrode applications. Inclusion of nitrogen-containing compounds may also lead to an improved processability profile in common solvents by improving solubility in a dispersion.

In one aspect, the present disclosure provides a copolymer including divalent units represented by formula —[CF$_2$—CF$_2$]—, divalent units represented by formula:

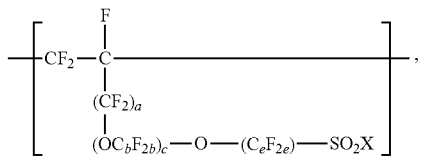

and divalent units independently represented by formula:

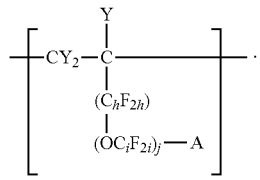

In these formulas, a is 0 or 1, b is a number from 2 to 8, c is a number from 0 to 2, e is a number from 1 to 8, X is independently —F, —NZH, —NZSO$_2$(CF$_2$)$_{1-6}$SO$_2$X', —NZ[SO$_2$(CF$_2$)$_d$SO$_2$NZ]$_{1-10}$SO$_2$(CF$_2$)$_d$SO$_2$X', or —OZ, each Y is independently —F or —H, with the proviso that one Y may be —CF$_3$, each Z is independently a hydrogen, alkyl having up to four carbon atoms, an alkali-metal cation, or a quaternary ammonium cation, A is —N(RF$^a$)$_2$ or a non-aromatic, 5- to 8-membered, perfluorinated ring comprising one or two nitrogen atoms in the ring and optionally comprising at least one oxygen atom in the ring, each RF$^a$ is independently linear or branched perfluoroalkyl having 1 to 8 carbon atoms and optionally interrupted by at least one catenated O or N atom, h is 0, 1, or 2, each i is independently 2 to 8, and j is 0, 1, or 2.

In another aspect, the present disclosure provides a polymer electrolyte membrane that includes the copolymer of the present disclosure.

In another aspect, the present disclosure provides a catalyst ink that includes the copolymer of the present disclosure.

In another aspect, the present disclosure provides a membrane electrode assembly that includes at least one of such a polymer electrolyte membrane or catalyst ink.

In another aspect, the present disclosure provides a binder for an electrochemical system that includes the copolymer of the present disclosure.

In another aspect, the present disclosure provides a battery or electrode that includes such a binder.

In this application:

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Alkylene" is the multivalent (e.g., divalent or trivalent) form of the "alkyl" groups defined above. "Arylene" is the multivalent (e.g., divalent or trivalent) form of the "aryl" groups defined above.

"Arylalkylene" refers to an "alkylene" moiety to which an aryl group is attached. "Alkylarylene" refers to an "arylene" moiety to which an alkyl group is attached.

The terms "perfluoro" and "perfluorinated" refer to groups in which all C—H bonds are replaced by C—F bonds.

The phrase "interrupted by at least one —O— group", for example, with regard to a perfluoroalkyl or perfluoroalkylene group refers to having part of the perfluoroalkyl or perfluoroalkylene on both sides of the —O— group. For example, —$CF_2CF_2$—O—$CF_2$—$CF_2$— is a perfluoroalkylene group interrupted by an —O—.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

The copolymer of the present disclosure includes divalent units represented by formula —[$CF_2$—$CF_2$]—. In some embodiments, the copolymer comprises at least 60 mole % of divalent units represented by formula —[$CF_2$—$CF_2$]—, based on the total moles of divalent units. In some embodiments, the copolymer comprises at least 65, 70, 75, 80, or 90 mole % of divalent units represented by formula —[$CF_2$—$CF_2$]—, based on the total moles of divalent units. Divalent units represented by formula —[$CF_2$—$CF_2$]— are incorporated into the copolymer by copolymerizing components including tetrafluoroethylene (TFE). In some embodiments, the components to be polymerized include at least 60, 65, 70, 75, 80, or 90 mole % TFE, based on the total moles of components to be polymerized.

The copolymer according to the present disclosure includes at least one divalent unit independently represented by formula:

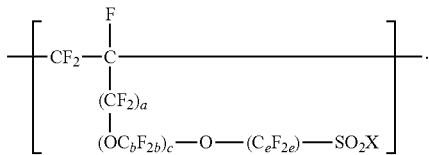

In this formula, a is 0 or 1, b is a number from 2 to 8, c is a number from 0 to 2, and e is a number from 1 to 8. In some embodiments, b is a number from 2 to 6 or 2 to 4. In some embodiments, b is 2. In some embodiments, e is a number from 1 to 6 or 2 to 4. In some embodiments, e is 2. In some embodiments, e is 4. In some embodiments, c is 0 or 1. In some embodiments, c is 0. In some embodiments, c is 0, and e is 2 or 4. In some embodiments, c is 0, and e is 3 to 8, 3 to 6, 3 to 4, or 4. In some embodiments, at least one of c is 1 or 2 or e is 3 to 8, 3 to 6, 3 to 4, or 4. In some embodiments, when a and c are 0, then e is 3 to 8, 3 to 6, 3 to 4, or 4. In some embodiments, b is 3, c is 1, and e is 2. In some embodiments, b is 2 or 3, c is 1, and e is 2 or 4. In some embodiments, a, b, c, and e may be selected to provide greater than 2, at least 3, or at least 4 carbon atoms. $C_eF_{2e}$ may be linear or branched. In some embodiments, $C_eF_{2e}$ can be written as $(CF_2)_e$, which refers to a linear perfluoroalkylene group. When c is 2, the b in the two $C_bF_{2b}$ groups may be independently selected. However, within a $C_bF_{2b}$ group, a person skilled in the art would understand that b is not independently selected. Also in this formula and in any —$SO_2X$ end groups that may be present, X is independently —F, —NZH, —$NZSO_2(CF_2)_{1-6}SO_2X'$, —NZ[$SO_2$ $(CF_2)_dSO_2NZ]_{1-10}$ $SO_2(CF_2)_dSO_2X'$ (in which each d is independently 1 to 6, 1 to 4, or 2 to 4), or —OZ. In some embodiments, X is independently —F, —NZH, or —OZ. In some embodiments, X is —NZH or —OZ. In some embodiments, X is —F or —OZ. In some embodiments, X is —OZ. In some embodiments, X is independently —NZH, —$NZSO_2(CF_2)_{1-6}SO_2X'$, or —$NZ[SO_2(CF_2)_dSO_2 NZ]_{1-10}SO_2(CF_2)_dSO_2X'$. X' is independently —NZH or —OZ (in some embodiments, —OZ). In any of these embodiments, each Z is independently a hydrogen, alkyl having up to 4, 3, 2, or 1 carbon atoms, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z is an alkali-metal cation. In some embodiments, Z is a sodium or lithium cation. In some embodiments, Z is a sodium cation. Copolymers having divalent units represented by this formula can be prepared by copolymerizing components including at least one polyfluoroallyloxy or polyfluorovinyloxy compound represented by formula $CF_2$=$CF(CF_2)_a$—$(OC_bF_{2b})_c$—$(C_eF_{2e})$—$SO_2X''$, in which a, b, c, and e are as defined above in any of their embodiments, and each X'' is independently —F, —NZH, or —OZ. Suitable polyfluoroallyloxy and polyfluorovinyloxy compounds of this formula include $CF_2$=$CFCF_2$—O—$CF_2$—$SO_2X''$, $CF_2$=$CFCF_2$—O—$CF_2CF_2$—$SO_2X''$, $CF_2$=$CFCF_2$—O—$CF_2CF_2CF_2$—$SO_2X''$, $CF_2$=$CFCF_2$—O—$CF_2CF_2CF_2CF_2$—$SO_2X''$, $CF_2$=$CFCF_2$—O—$CF_2CF(CF_3)$—O—$(CF_2)_e$—$SO_2X''$, $CF_2$=CF—O—$CF_2$—$SO_2X''$, $CF_2$=CF—O—$CF_2CF_2$—$SO_2X''$, $CF_2$=CF—O—$CF_2CF_2CF_2$—$SO_2X''$, $CF_2$=CF—O—$CF_2CF_2CF_2CF_2$—$SO_2X''$, and $CF_2$=CF—O—$CF_2CF(CF_3)$—O—$(CF_2)_e$—$SO_2X''$. In some embodiments, the compound represented by formula $CF_2$=$CF(CF_2)_a$—$(OC_bF_{2b})_c$—$(C_eF_{2e})$—$SO_2X''$ is $CF_2$=$CFCF_2$—O—$CF_2CF_2$—$SO_2X''$, $CF_2$=CF—O—$CF_2CF_2$—$SO_2X''$, $CF_2$=$CFCF_2$—O—$CF_2CF_2CF_2CF_2$—$SO_2X''$, or $CF_2$=CF—O—$CF_2CF_2CF_2CF_2$—$SO_2X''$. In some embodiments, the compound represented by formula $CF_2$=CF $(CF_2)_a$—$(OC_bF_{2b})_c$—O—$(C_eF_{2e})$—$SO_2X''$ is $CF_2$=$CFCF_2$—O—$CF_2CF_2$—$SO_2X''$, $CF_2$=$CFCF_2$—O—$CF_2CF_2CF_2CF_2$—$SO_2X''$, or $CF_2$=CF—O—$CF_2CF_2CF_2CF_2$—$SO_2X''$. In some embodiments, the compound represented by formula $CF_2$=$CF(CF_2)_a$—$(OC_bF_{2b})_c$—O—$(C_eF_{2e})$—$SO_2X''$ is $CF_2$=$CFCF_2$—O—$CF_2CF_2$—$SO_2X''$ or $CF_2$=$CFCF_2$—O—$CF_2CF_2CF_2CF_2$—$SO_2X''$.

Compounds represented by formula $CF_2$=$CF(CF_2)_a$—$(OC_bF_{2b})_c$—O—$(C_eF_{2e})$—$SO_2X''$ can be made by known methods. For example acid fluorides represented by formula $FSO_2(CF_2)_{e-1}$—C(O)F or $FSO_2(CF_2)_e$—$(OC_bF_{2b})_{c-1}$—C(O)F can be reacted with perfluoroallyl chloride, perfluoroallyl bromide, or perfluoroallyl fluorosulfate in the presence of potassium fluoride as described in U.S. Pat. No. 4,273,729 (Krespan) to make compounds of formula $CF_2$=$CFCF_2$—$(OC_bF_{2b})_c$—O—$(C_eF_{2e})$—$SO_2F$. Compounds of formula $CF_2$=$CFCF_2$—$(OC_bF_{2b})_c$—O—$(C_eF_{2e})$—$SO_2F$ can be hydrolyzed with a base (e.g., alkali metal hydroxide or ammonium hydroxide) to provide a compound represented by formula $CF_2$=$CFCF_2$—$(OC_bF_{2b})_c$—O—$(C_eF_{2e})$—$SO_3Z$.

In some embodiments of the copolymer of the present disclosure, at least some of the fluorinated divalent units are derived from at least one short-chain SO$_2$X"-containing vinyl ether monomer. Likewise, short-chain SO$_2$X"-containing vinyl ether monomers may be useful components to be polymerized in the methods according to the present disclosure. Short-chain SO$_2$X"-containing vinyl ether monomers represented by formula CF$_2$=CF—O—(CF$_2$)$_2$—SO$_2$X" (e.g., those represented by formula [CF$_2$=CF—O—(CF$_2$)$_2$—SO$_3$]M, where M is an alkali metal, and CF$_2$=CF—O—(CF$_2$)$_2$—SO$_2$NZH) can be made by known methods. Conveniently, a compound of formula [CF$_2$=CF—O—(CF$_2$)$_2$—SO$_3$]M can be prepared in three steps from the known compound represented by formula FC(O)—CF(CF$_3$)—O—(CF$_2$)$_2$—SO$_2$F. As reported in Gronwald, O., et al; "Synthesis of difluoroethyl perfluorosulfonate monomer and its application"; *J. Fluorine Chem.*, 2008, 129, 535-540, the acid fluoride can be combined with a methanol solution of sodium hydroxide to form the disodium salt, which can be dried and heated in dry diglyme to effect the carboxylation. FC(O)—CF(CF$_3$)—O—(CF$_2$)$_2$—SO$_2$F can be prepared by ring-opening and derivatization of tetrafluoroethane-β-sultone as described in U.S. Pat. No. 4,962,292 (Marraccini et al.). Compounds represented by formula CF$_2$=CF—O—(CF$_2$)$_a$—SO$_2$X" can also be prepared by hydrolyzing the products from the elimination of halogen from a compound of formula CF$_2$Cl—CFCl—O—(CF$_2$)$_2$—SO$_2$F described in U.S. Pat. No. 6,388,139 (Resnick) and or hydrolyzing the products of decarboxylation of FSO$_2$—(CF$_2$)$_{3-4}$—O—CF(CF$_3$)— COO$^-$)$_p$M$^{+p}$ described in U.S. Pat. No. 6,624,328 (Guerra). Compounds of formula CF$_2$=CF—O—(CF$_2$)$_2$—SO$_2$NH$_2$ can be prepared, for example, by reaction of a cyclic sulfone with one equivalent of LHMDS as described by Uematsu, N., et al. "Synthesis of novel perfluorosulfonamide monomers and their application"; *J. Fluorine Chem.*, 2006, 127, 1087-1095.

The copolymer according to the present disclosure includes at least one divalent unit independently represented by formula:

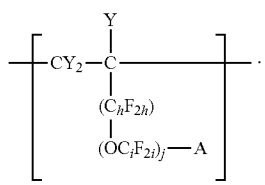

In this formula, each Y is independently —F or —H, with the proviso that one Y may be —CF$_3$, "A" is N(RF$^a$)$_2$ or a non-aromatic, 5- to 8-membered, perfluorinated ring comprising one or two nitrogen atoms in the ring and optionally comprising at least one oxygen atom in the ring, each RF$^a$ is independently linear or branched perfluoroalkyl having 1 to 8 carbon atoms and optionally interrupted by at least one catenated O or N atom, h is 0, 1, or 2, each i is independently 2 to 8, and j is 0, 1, or 2. C$_h$F$_{2h}$ may be linear or branched. In some embodiments, h is 0; in some embodiments, h is 1. In some embodiments, i is a number from 2 to 6 or 2 to 4. In some embodiments, i is 2 or 3. C$_i$F$_{2i}$ may be linear or branched. In some embodiments, C$_i$F$_{2i}$ can be written as (CF$_2$)$_i$, which refers to a linear perfluoroalkylene group. When j is 2, the i in the two C$_i$F$_{2i}$ groups may be independently selected. However, within a C$_i$F$_{2i}$ group, a person skilled in the art would understand that i is not independently selected. In some embodiments, j is 1 or 2. In some embodiments, j is 1. In some embodiments, each Y is —F. In some embodiments, A is N(RF$^a$)$_2$ in which each RF$^a$ is perfluoroalkyl having up to 4 carbon atoms. In some embodiments, "A" is the non-aromatic, 5- to 8-membered, perfluorinated ring. In some embodiments, "A" is bonded to the copolymer chain through a nitrogen atom. "A" can be substituted by a perfluoroalkyl group. In some embodiments, "A" is a 5- or 6-membered ring, which is optionally substituted by perfluoroalkyl having 1 to 5, 1 to 3, or 1 to 2 carbon atoms. In some embodiments, "A" is

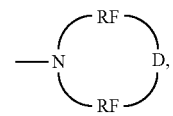

wherein each RF is independently perfluorinated alkylene having 2 to 4 (in some embodiments, 2) carbon atoms, and D is a bond, —CF$_2$—, —O—, or —N-perfluoroalkyl. In these embodiments, the divalent units may alternatively by written as

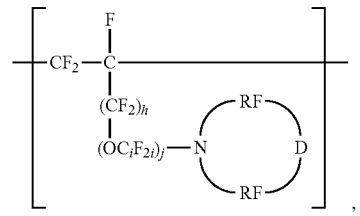

wherein h, i, and j are as defined above in any of their embodiments. The perfluorinated alkylene RF may be linear or branched. With branched perfluorinated alkylene groups, the ring may be substituted by perfluoroalkyl having 1 to 3, or 1 to 2 carbon atoms. In some embodiments, D is a bond or —CF$_2$—. In some embodiments, D is —O—. In some embodiments, "A" is

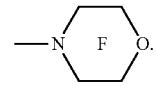

In these embodiments, the divalent units may alternatively by written as

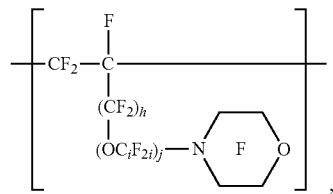

wherein h, i, and j are as defined above in any of their embodiments. Copolymers having divalent units represented by this formula can be prepared by copolymerizing components including at least one compound represented by formula CF$_2$=CF(CF$_2$)$_h$—(OC$_i$F$_{2i}$)$_j$-A, in which h, i, and j are as defined above in any of their embodiments.

Useful compounds represented by formula $CF_2=CF(CF_2)_h\text{—}(OC_iF_{2i})_j\text{-A}$ include perfluorinated vinyl- and allyl-substituted amines pyrrolidines, piperidines, morpholines, and piperazines such as
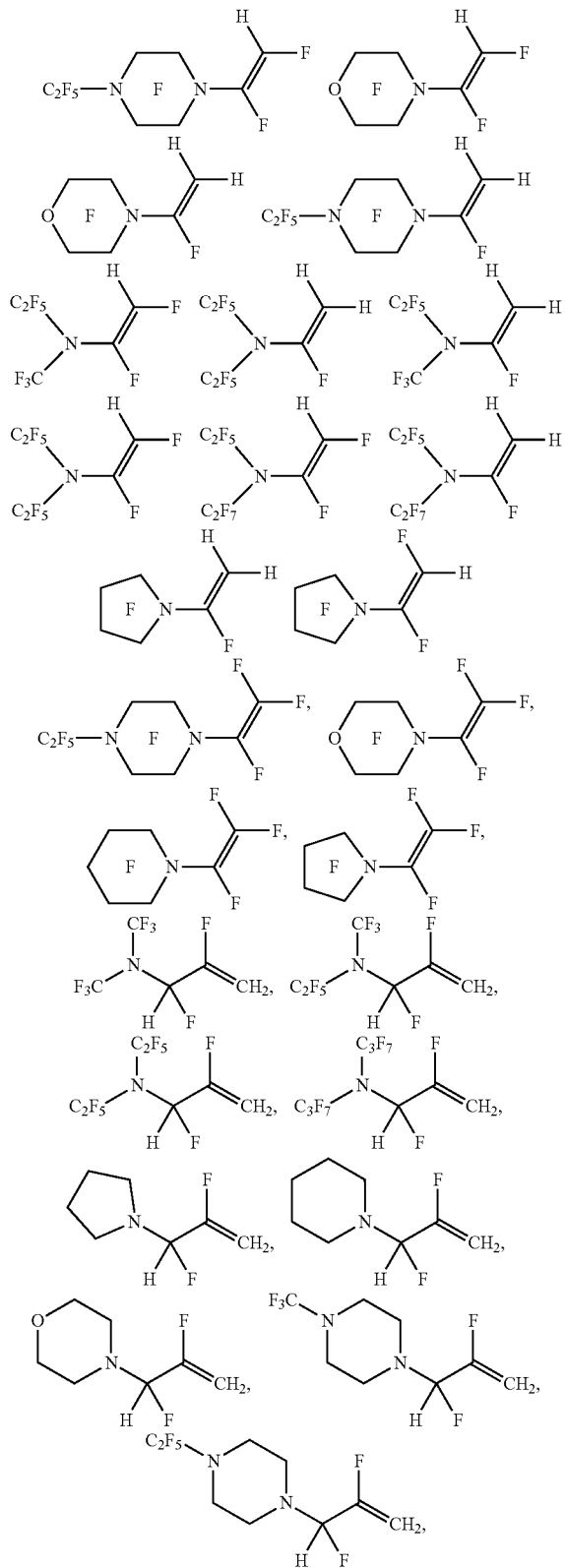
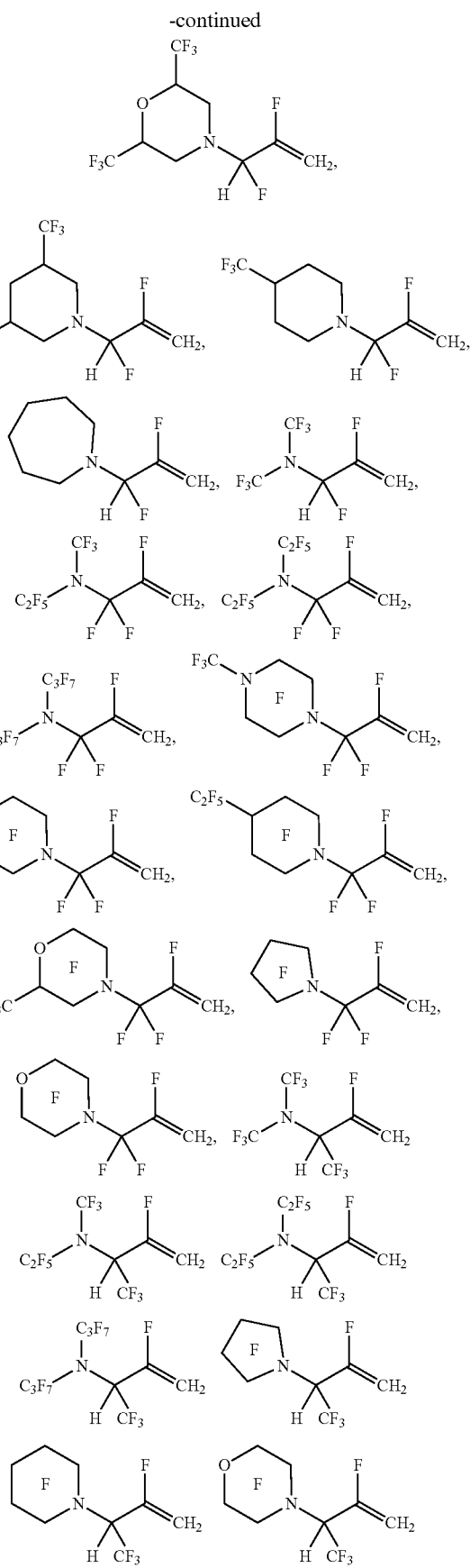

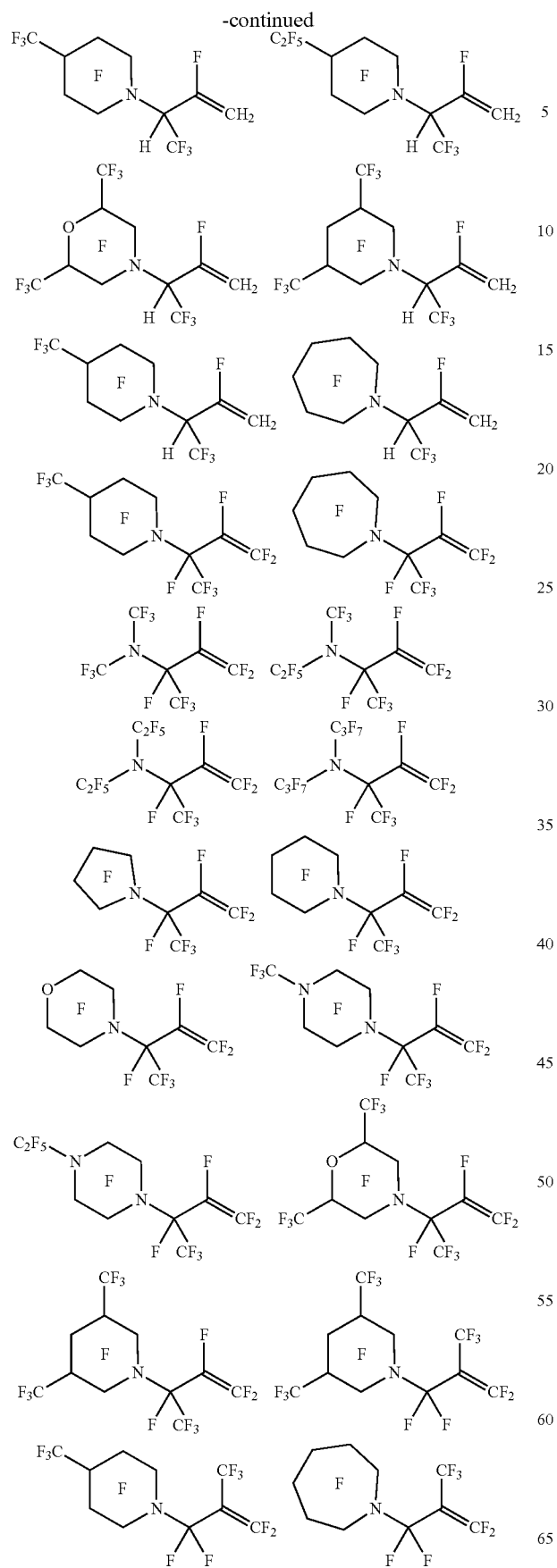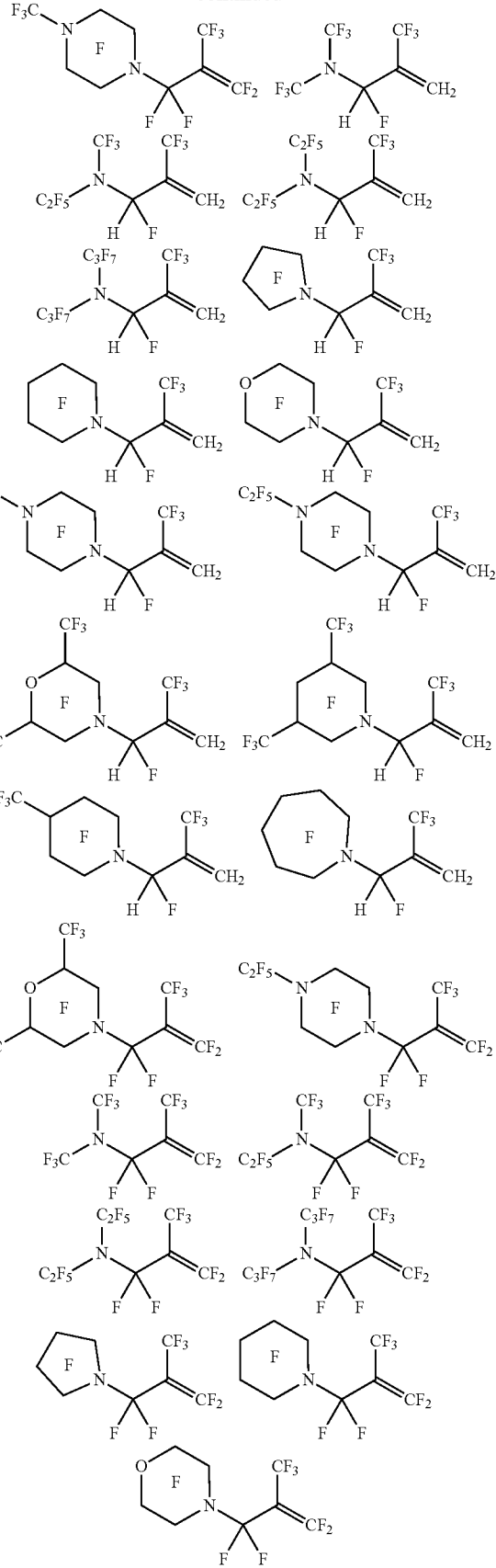

In these embodiments, j is 0, and h is 0, 1, or 2. These compounds can be synthesized as described in T. Abe, et al. *Chem. Lett.* 1989, 905, JP 01070444A (Abe); JP 0107445A (Abe), Int. Pat. Appl. WO2017/106119 (Bulinski et al.) and the references cited therein, for example. Further useful compounds represented by formula $CF_2=CF(CF_2)_h-(OC_iF_{2i})_j$-A include perfluorinated pyrrolidine-, piperidine-, morpholine-, and piperazine-substituted alkyl vinyl ethers. In these embodiments, h is 0, and j is 1 or 2, and i is as defined above in any of its embodiments. These vinyl ethers can be synthesized as described in U.S. Pat. Appl. Pub. No. 2014/0130713 (Costello et al.) and Hayakawa et al. *Polymer*, 1995, Vol. 36, No. 14, pp. 2807-2812, for example.

The compounds represented by formula $CF_2=CF(CF_2)_h-(OC_iF_{2i})_j$-A described above in any of their embodiments may be present in the components to be polymerized in any useful amount, in some embodiments, in an amount of up to 20, 15, 10, 7.5, or 5 mole percent, at least 0.5, 1, 2, 3, 4, 4.5, 5, or 7.5 mole percent, or in a range from 0.5 to 20, 1 to 20, 2 to 20, or 0.5 to 10 mole percent, based on the total amount of polymerizable components. Accordingly, the copolymer according to the present disclosure can include divalent units derived from these compounds represented by formula $CF_2=CF(CF_2)_h-(OC_iF_{2i})_j$-A in any useful amount, in some embodiments, in an amount of up to 20, 15, 10, 7.5, or 5 mole percent, at least 0.5, 1, 2, 3, 4, 4.5, 5, or 7.5 mole percent, or in a range from 0.5 to 20, 1 to 20, 2 to 20, or 0.5 to 10 mole percent, based on the total moles of divalent units.

In some embodiments of the copolymer of the present disclosure, the copolymer includes divalent units represented by formula

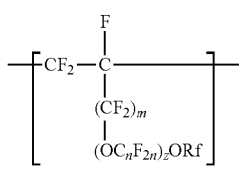

In this formula Rf is a linear or branched perfluoroalkyl group having from 1 to 8 carbon atoms and optionally interrupted by one or more —O— groups, z is 0, 1 or 2, each n is independently from 1 to 4, and m is 0 or 1. In some embodiments, n is 1, 3, or 4, or from 1 to 3, or from 2 to 3, or from 2 to 4. In some embodiments, when z is 2, one n is 2, and the other is 1, 3, or 4. In some embodiments, when a is 1 in any of the formulas described above, for example, n is from 1 to 4, 1 to 3, 2 to 3, or 2 to 4. In some embodiments, n is 1 or 3. In some embodiments, n is 1. In some embodiments, n is not 3. When z is 2, the n in the two $C_nF_{2n}$ groups may be independently selected. However, within a $C_nF_{2n}$ group, a person skilled in the art would understand that n is not independently selected. $C_nF_{2n}$ may be linear or branched. In some embodiments, $C_nF_{2n}$ is branched, for example, $-CF_2-CF(CF_3)-$. In some embodiments, $C_nF_{2n}$ can be written as $(CF_2)_n$, which refers to a linear perfluoroalkylene group. In these cases, the divalent units of this formula are represented by formula

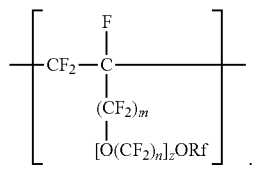

In some embodiments, $C_nF_{2n}$ is $-CF_2-CF_2-CF_2-$. In some embodiments, $(OC_nF_{2n})_z$ is represented by $-O-(CF_2)_{1-4}-[O(CF_2)_{1-4}]_{0-1}$. In some embodiments, Rf is a linear or branched perfluoroalkyl group having from 1 to 8 (or 1 to 6) carbon atoms that is optionally interrupted by up to 4, 3, or 2 —O— groups. In some embodiments, Rf is a perfluoroalkyl group having from 1 to 4 carbon atoms optionally interrupted by one —O— group. In some embodiments, z is 0, m is 0, and Rf is a linear or branched perfluoroalkyl group having from 1 to 4 carbon atoms. In some embodiments, z is 0, m is 0, and Rf is a branched perfluoroalkyl group having from 3 to 8 carbon atoms. In some embodiments, m is 1, and Rf is a branched perfluoroalkyl group having from 3 to 8 carbon atoms or a linear perfluoroalkyl group having 5 to 8 carbon atoms. In some embodiments, Rf is a branched perfluoroalkyl group having from 3 to 6 or 3 to 4 carbon atoms. An example of a useful perfluoroalkyl vinyl ether (PAVE) from which these divalent units in which m and z are 0 are derived is perfluoroisopropyl vinyl ether ($CF_2=CFOCF(CF_3)_2$), also called iso-PPVE. Other useful PAVEs include perfluoromethyl vinyl ether, perfluoroethyl vinyl ether, and perfluoropropyl vinyl ether.

Divalent units represented by formulas

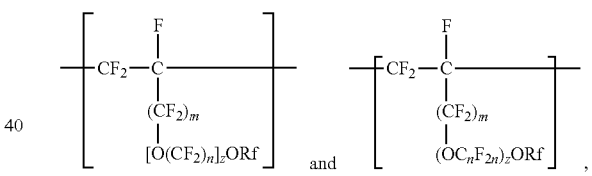

which m is 0, typically arise from perfluoroalkoxyalkyl vinyl ethers. Suitable perfluoroalkoxyalkyl vinyl ethers (PAOVE) include those represented by formula $CF_2=CF[O(CF_2)_n]_zORf$ and $CF_2=CF(OC_nF_{2n})_zORf$, in which n, z, and Rf are as defined above in any of their embodiments. Examples of suitable perfluoroalkoxyalkyl vinyl ethers include $CF_2=CFOCF_2OCF_3$, $CF_2=CFOCF_2OCF_2CF_3$, $CF_2=CFOCF_2CF_2OCF_3$, $CF_2=CFOCF_2CF_2CF_2OCF_3$, $CF_2=CFOCF_2CF_2CF_2CF_2OCF_3$, $CF_2=CFOCF_2CF_2OCF_2CF_3$, $CF_2=CFOCF_2CF_2CF_2OCF_2CF_3$, $CF_2=CFOCF_2CF_2CF_2CF_2OCF_2CF_3$, $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_2OCF_3$, $CF_2=CFOCF_2CF_2OCF_2CF_2CF_3$, $CF_2=CFOCF_2CF_2OCF_2CF_2OCF_2CF_3$, $CF_2=CFOCF_2CF(CF_3)-O-C_3F_7$ (PPVE-2), $CF_2=CF(OCF_2CF(CF_3))_2-O-C_3F_7$(PPVE-3), and $CF_2=CF(OCF_2CF(CF_3))_3-O-C_3F_7$(PPVE-4). In some embodiments, the perfluoroalkoxyalkyl vinyl ether is selected from $CF_2=CFOCF_2OCF_3$, $CF_2=CFOCF_2OCF_2CF_3$, $CF_2=CFOCF_2CF_2OCF_3$, $CF_2=CFOCF_2CF_2CF_2OCF_3$, $CF_2=CFOCF_2CF_2CF_2CF_2OCF_3$, $CF_2=CFOCF_2CF_2CF_2OCF_2CF_3$, $CF_2=CFOCF_2CF_2CF_2CF_2OCF_2CF_3$, $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_2OCF_3$, and combinations thereof. Many of these perfluoroalkoxyalkyl vinyl ethers can be prepared according to the methods described in U.S. Pat. No. 6,255,536 (Worm et al.) and 6,294,627 (Worm et al.). In some embodiments, the PAOVE is perfluoro-3-methoxy-n-propyl vinyl ether. In some embodiments, the PAOVE is other than perfluoro-3-methoxy-n-propyl vinyl ether.

The divalent units represented by formula

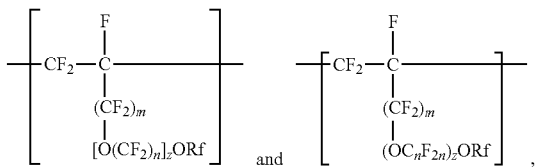

in which m is 1, are typically derived from at least one perfluoroalkoxyalkyl allyl ether. Suitable perfluoroalkoxyalkyl allyl ethers include those represented by formula $CF_2=CFCF_2(OC_nF_{2n})_zORf$, in which n, z, and Rf are as defined above in any of their embodiments. Examples of suitable perfluoroalkoxyalkyl allyl ethers include $CF_2=CFCF_2OCF_2CF_2OCF_3$, $CF_2=CFCF_2OCF_2CF_2CF_2OCF_3$, $CF_2=CFCF_2OCF_2OCF_3$, $CF_2=CFCF_2OCF_2OCF_2CF_3$, $CF_2=CFCF_2OCF_2CF_2CF_2OCF_3$, $CF_2=CFCF_2OCF_2CF_2OCF_2CF_3$, $CF_2=CFCF_2OCF_2CF_2CF_2OCF_2CF_3$, $CF_2=CFCF_2OCF_2CF_2CF_2CF_2OCF_2CF_3$, $CF_2=CFCF_2OCF_2CF_2OCF_2OCF_3$, $CF_2=CFCF_2OCF_2CF_2OCF_2CF_2OCF_3$, $CF_2=CFCF_2OCF_2CF_2OCF_2CF_2CF_2OCF_3$, $CF_2=CFCF_2OCF_2CF_2OCF_2CF_2CF_2CF_2OCF_3$, $CF_2=CFCF_2OCF_2CF_2(OCF_2)_3OCF_3$, $CF_2=CFCF_2OCF_2CF_2(OCF_2)_4OCF_3$, $CF_2=CFCF_2OCF_2CF_2OCF_2OCF_2OCF_3$, $CF_2=CFCF_2OCF_2CF_2OCF_2CF_2CF_3$, $CF_2=CFCF_2OCF_2CF_2OCF_2CF_2OCF_2CF_3$, $CF_2=CFCF_2OCF_2CF(CF_3)-O-C_3F_7$, and $CF_2=CFCF_2(OCF_2CF(CF_3))_2-O-C_3F_7$. In some embodiments, the perfluoroalkoxyalkyl allyl ether is selected from $CF_2=CFCF_2OCF_2CF_2OCF_3$, $CF_2=CFCF_2OCF_2CF_2CF_2OCF_3$, $CF_2=CFCF_2OCF_2OCF_3$, $CF_2=CFCF_2OCF_2OCF_2CF_3$, $CF_2=CFCF_2OCF_2CF_2CF_2OCF_3$, $CF_2=CFCF_2OCF_2CF_2OCF_2CF_3$, $CF_2=CFCF_2OCF_2CF_2CF_2OCF_2CF_3$, $CF_2=CFCF_2OCF_2CF_2CF_2CF_2OCF_2CF_3$, $CF_2=CFCF_2OCF_2CF_2OCF_2OCF_3$, $CF_2=CFCF_2OCF_2CF_2OCF_2CF_2OCF_3$, $CF_2=CFCF_2OCF_2CF_2OCF_2CF_2CF_2OCF_3$, $CF_2=CFCF_2OCF_2CF_2OCF_2CF_2CF_2CF_2OCF_3$, $CF_2=CFCF_2OCF_2CF_2(OCF_2)_3OCF_3$, $CF_2=CFCF_2OCF_2CF_2(OCF_2)_4OCF_3$, $CF_2=CFCF_2OCF_2CF_2OCF_2OCF_2OCF_3$, $CF_2=CFCF_2OCF_2CF_2OCF_2CF_2CF_3$, $CF_2=CFCF_2OCF_2CF_2OCF_2CF_2OCF_2CF_3$, and combinations thereof.

Many of these perfluoroalkoxyalkyl allyl ethers can be prepared, for example, according to the methods described in U.S. Pat. No. 4,349,650 (Krespan). Perfluoroalkoxyalkyl allyl ethers can also be prepared by combining first components comprising at least one of $CF_2=CF-CF_2-OSO_2Cl$ or $CF_2=CF-CF_2-OSO_2CF_3$, a polyfluorinated compound comprising at least one ketone or carboxylic acid halide or combination thereof, and fluoride ion. Polyfluorinated compounds comprising at least one ketone or carboxylic acid halide or combination thereof and fluoride ions can be any of those described, for example, in U.S. Pat. No. 4,349,650 (Krespan). $CF_2=CF-CF_2-OSO_2Cl$ can conveniently be prepared by reaction of boron trichloride ($BCl_3$) and $ClSO_3H$ to provide $B(OSO_2Cl)_3$ and subsequently reacting the $B(OSO_2Cl)_3$ and hexafluoropropylene (HFP) as described in Int. Pat. Appl. Pub. No. WO 2018/211457 (Hintzer et al.). Combining components comprising $M(OSO_2CF_3)_3$ and hexafluoropropylene (HFP) provides $CF_2=CF-CF_2-OSO_2CF_3$, wherein M is Al or B. $Al(OSO_2CF_3)_3$ is commercially available, for example, from chemical suppliers such as abcr GmbH (Karlsruhe, Germany) and Sigma-Aldrich (St. Louis, Missouri). Reaction of $BCl_3$ and $CF_3SO_3H$ can be useful to provide $B(OSO_2CF_3)_3$. Further details about the preparation of $CF_2=CF-CF_2-OSO_2CF_3$ can be found in Int. Pat. Appl. Pub. No. WO 2018/211457 (Hintzer et al.).

The vinyl ethers and allyl ethers described above in any of their embodiments, may be present in the components to be polymerized in any useful amount, in some embodiments, in an amount of up to 20, 15, 10, 7.5, or 5 mole percent, at least 3, 4, 4.5, 5, or 7.5 mole percent, or in a range from 3 to 20, 4 to 20, 4.5 to 20, 5 to 20, 7.5 to 20, or 5 to 15 mole percent, based on the total amount of polymerizable components. Accordingly, the copolymer according to the present disclosure can include divalent units derived from these vinyl ethers and allyl ethers in any useful amount, in some embodiments, in an amount of up to 20, 15, 10, 7.5, or 5 mole percent, at least 3, 4, 4.5, 5, or 7.5 mole percent, or in a range from 3 to 20, 4 to 20, 4.5 to 20, 5 to 20, 7.5 to 20, or 5 to 15 mole percent, based on the total moles of divalent units. In some embodiments, copolymers of the present disclosure are free of divalent units represented by formula

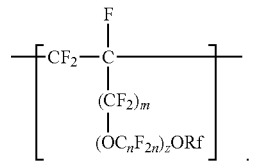

In some embodiments of the copolymer of the present disclosure, the copolymer includes divalent units derived from at least one fluorinated olefin independently represented by formula $C(R)_2=CF-Rf_2$. These fluorinated divalent units are represented by formula $-[CR_2-CFRf_2]-$. In formulas $C(R)_2=CF-Rf_2$ and $-[CR_2-CFRf_2]-$, $Rf_2$ is fluorine or a perfluoroalkyl having from 1 to 8, in some embodiments 1 to 3, carbon atoms, and each R is independently hydrogen, fluorine, or chlorine. Some examples of fluorinated olefins useful as components of the polymerization include, hexafluoropropylene (HFP), trifluorochloroethylene (CTFE), and partially fluorinated olefins (e.g., vinylidene fluoride (VDF), tetrafluoropropylene (R1234yf), pentafluoropropylene, and trifluoroethylene). In some embodiments, the copolymer includes at least one of divalent units derived from chlorotrifluoroethylene or divalent units derived from hexafluoropropylene. Divalent units represented by formula —[CR$_2$—CFRf$_2$]— may be present in the copolymer in any useful amount, in some embodiments, in an amount of up to 10, 7.5, or 5 mole percent, based on the total moles of divalent units.

In some embodiments of the copolymer of the present disclosure, the copolymer is essentially free of VDF units, and the components to be copolymerized are essentially free of VDF. For example, at a pH higher than 8, VDF may undergo dehydrofluorination, and it may be useful to exclude VDF from the components to be polymerized. "Essentially free of VDF" can mean that VDF is present in the components to be polymerized at less than 1 (in some embodiments, less than 0.5, 0.1, 0.05, or 0.01) mole percent. "Essentially free of VDF" includes being free of VDF.

Copolymers of the present disclosure can comprise divalent units independently represented by formula:

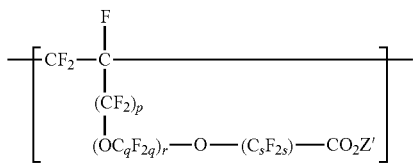

wherein p is 0 or 1, q is 2 to 8, r is 0 to 2, s is 1 to 8, and Z' is a hydrogen, an alkali-metal cation, or a quaternary ammonium cation. In some embodiments, q is a number from 2 to 6 or 2 to 4. In some embodiments, q is 2. In some embodiments, s is a number from 1 to 6 or 2 to 4. In some embodiments, s is 2. In some embodiments, s is 4. In some embodiments, r is 0 or 1. In some embodiments, r is 0. In some embodiments, r is 0, and s is 2 or 4. In some embodiments, q is 3, r is 1, and s is 2. C$_s$F$_{2s}$ may be linear or branched. In some embodiments, C$_s$F$_{2s}$ can be written as (CF$_2$)$_s$, which refers to a linear perfluoroalkylene group. When r is 2, the q in the two C$_q$F$_{2q}$ groups may be independently selected. However, within a C$_q$F$_{2q}$ group, a person skilled in the art would understand that q is not independently selected. Each Z' is independently a hydrogen, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z' is an alkali-metal cation. In some embodiments, Z' is a sodium or lithium cation. In some embodiments, Z' is a sodium cation. Divalent units represented by formula

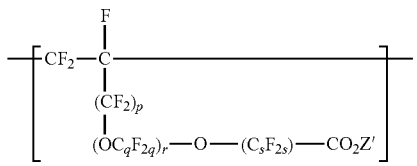

may be present in the copolymer in any useful amount, in some embodiments, in an amount of up to 10, 7.5, or 5 mole percent, based on the total moles of divalent units.

Copolymers of the present disclosure can also include units derived from bisolefins represented by formula X$_2$C=CY'—(CW$_2$)$_m$—(O)$_n$—R$_F$—(O)$_o$—(CW$_2$)$_p$—CY'=CX$_2$. In this formula, each of X, Y', and W is independently fluoro, hydrogen, alkyl, alkoxy, polyoxyalkyl, perfluoroalkyl, perfluoroalkoxy or perfluoropolyoxyalkyl, m and p are independently an integer from 0 to 15, and n, o are independently 0 or 1. In some embodiments, X, Y', and W are each independently fluoro, CF$_3$, C$_2$F$_5$, C$_3$F$_7$, C$_4$F$_9$, hydrogen, CH$_3$, C$_2$H$_5$, C$_3$H$_7$, C$_4$H$_9$. In some embodiments, X, Y', and W are each fluoro (e.g., as in CF$_2$=CF—O—R$_F$—O—CF=CF$_2$ and CF$_2$=CF—CF$_2$—O—R$_F$—O—CF$_2$—CF=CF$_2$). In some embodiments, n and o are 1, and the bisolefins are divinyl ethers, diallyl ethers, or vinyl-allyl ethers. R$_F$ represents linear or branched perfluoroalkylene or perfluoropolyoxyalkylene or arylene, which may be non-fluorinated or fluorinated. In some embodiments, R$_F$ is perfluoroalkylene having from 1 to 12, from 2 to 10, or from 3 to 8 carbon atoms. The arylene may have from 5 to 14, 5 to 12, or 6 to 10 carbon atoms and may be non-substituted or substituted with one or more halogens other than fluoro, perfluoroalkyl (e.g. —CF$_3$ and —CF$_2$CF$_3$), perfluoroalkoxy (e.g. —O—CF$_3$, —OCF$_2$CF$_3$), perfluoropolyoxyalkyl (e.g., —OCF$_2$OCF$_3$; —CF$_2$OCF$_2$OCF$_3$), fluorinated, perfluorinated, or non-fluorinated phenyl or phenoxy, which may be substituted with one or more perfluoroalkyl, perfluoroalkoxy, perfluoropolyoxyalkyl groups, one or more halogens other than fluoro, or combinations thereof. In some embodiments, R$_F$ is phenylene or mono-, di-, tri- or tetrafluoro-phenylene, with the ether groups linked in the ortho, para or meta position. In some embodiments, R$_F$ is CF$_2$; (CF$_2$)$_q$ wherein q is 2, 3, 4, 5, 6, 7 or 8; CF$_2$—O—CF$_2$; CF$_2$—O—CF$_2$—CF$_2$; CF(CF$_3$)CF$_2$; (CF$_2$)$_2$—O—CF(CF$_3$)—CF$_2$; CF(CF$_3$)—CF$_2$—O—CF(CF$_3$)CF$_2$; or (CF$_2$)$_2$—O—CF(CF$_3$)—CF$_2$—O—CF(CF$_3$)—CF$_2$—O—CF$_2$. The bisolefins can introduce long chain branches as described in U.S. Pat. Appl. Pub. No. 2010/0311906 (Lavallde et al.). The bisolefins, described above in any of their embodiments, may be present in the components to be polymerized in any useful amount, in some embodiments, in an amount of up to 2, 1, or 0.5 mole percent and in an amount of at least 0.1 mole percent, based on the total amount of polymerizable components.

Copolymers of the present disclosure can also include units derived from non-fluorinated monomers. Examples of suitable non-fluorinated monomers include ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, and hydroxybutyl vinyl ether. Any combination of these non-fluorinated monomers may be useful. In some embodiments, the components to be polymerized further include acrylic acid or methacrylic acid, and the copolymer of the present disclosure includes units derived from acrylic acid or methacrylic acid.

Typically, the copolymer of the present disclosure does not include cyclic structures comprising fluorinated carbon atoms in the main chain (that is, divalent units comprising such cyclic structures) such as derived from perfluorinted dioxoles and dioxolanes. In the copolymers of the presented disclosure, the nitrogen-containing compound is pendent from the main chain, and the carbon atoms included in the ring do not form part of the main chain. Since the nitrogen-containing rings are pendent from the main chain, the copolymers of the present disclosure tend to have lower glass transition temperatures than copolymers that include cyclic structures comprising fluorinated carbon atoms. As a result, films that are formed from the copolymers can be more flexible and less brittle than copolymers such as those described in 2013/0253157 (Takami), 2013/0245219 (Perry), and 2013/0252134 (Takami), and U.S. Pat. No. 8,470,943 (Watakabe).

In some embodiments, the copolymer according to the present disclosure can be made from the sulfonyl fluoride compounds, where X in any of the aforementioned compounds represented by formula $CF_2=CF(CF_2)_a$—$(OC_bF_{2b})_c$—O—$(C_eF_{2e})$—$SO_2X$ is F, according to the methods described below, for example. Hydrolysis of a copolymer having —$SO_2F$ groups with an alkaline hydroxide (e.g. LiOH, NaOH, or KOH) solution provides —$SO_3Z$ groups, which may be subsequently acidified to $SO_3H$ groups. Treatment of a copolymer having —$SO_2F$ groups with water and steam can form $SO_3H$ groups. Thus, copolymers having —$SO_2F$ groups (that is, in which X is F) are useful intermediates for making copolymers of the present disclosure.

In some embodiments, the copolymer of the present disclosure can be made by a method that includes copolymerizing components including at least one compound represented by formula $CF_2=CF(CF_2)_a$—$(OC_bF_{2b})_c$—O—$(C_eF_{2e})$—$SO_2X'$, b, c, and e are as defined above in any of their embodiments. In this formula, X' is —NZ'H or —OZ', wherein each Z' is independently a hydrogen, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z' is an alkali-metal cation. In some embodiments, Z' is a sodium or lithium cation. In some embodiments, Z' is a sodium cation. In some embodiments, the compound represented by formula $CF_2=CF(CF_2)_a$—$(OC_bF_{2b})_c$—O—$(C_eF_{2e})$—$SO_2X'$ is $CF_2=CFCF_2$—O—$CF_2CF_2$—$SO_3Na$.

The copolymer according to the present disclosure can have an —$SO_2X$ equivalent weight of up to 2000, 1900, 1800, or 1750. In some embodiments, the copolymer has an —$SO_2X$ equivalent weight of at least 600, 700, 800, 900, 950, or 1000. In some embodiments, the copolymer has an —$SO_2X$ equivalent weight in a range from 600 to 2000, 800 to 2000, 950 to 2000, or 1000 to 2000. In general, the —$SO_2X$ equivalent weight of the copolymer refers to the weight of the copolymer containing one mole of —$SO_2X$ groups, wherein X is as defined above in any of its embodiments. In some embodiments, the —$SO_2X$ equivalent weight of the copolymer refers to the weight of the copolymer that will neutralize one equivalent of base. In some embodiments, the —$SO_2X$ equivalent weight of the copolymer refers to the weight of the copolymer containing one mole of sulfonate groups (i.e., —$SO_3^-$). Decreasing the —$SO_2X$ equivalent weight of the copolymer tends to increase proton conductivity in the copolymer but tends to decrease its crystallinity, which may compromise the mechanical properties of the copolymer (e.g., tensile strength). Thus, the —$SO_2X$ equivalent weight of the copolymer in the fluoropolymer dispersion of the present disclosure typically and advantageously provides a balance of the requirements for the electrical and mechanical properties of the copolymer. Thus, the —$SO_2X$ equivalent weight may be selected based on a balance of the requirements for the electrical and mechanical properties of the copolymer or ionomer. In some embodiments, the —$SO_2X$ equivalent weight of the copolymer refers to the weight of the copolymer containing one mole of sulfonamide groups (i.e., —$SO_2NH$). Sulfonimide groups (e.g., when X is —$NZSO_2(CF_2)_{1-6}SO_2X'$ and —$NZ[SO_2(CF_2)_aSO_2NZ]_{1-10}SO_2(CF_2)_aSO_2X'$) also function as acid groups that can neutralize base as described in further detail below. The effect equivalent weight of copolymers including these groups can be much lower than 1000. Equivalent weight can be calculated from the molar ratio of monomer units in the copolymer using, for example, the equation shown in the Examples, below.

The copolymer of the present disclosure can have up to 30 mole percent of divalent units represented by formula

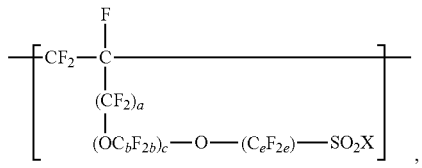

based on the total amount of the divalent units. In some embodiments, the copolymer comprises up to 25 or 20 mole percent of these divalent units, based on the total amount of these divalent units. The components that are copolymerized in the methods described herein can comprise up to 30 mole percent of at least one compound represented by formula $CF_2=CF(CF_2)_a$—$(OC_bF_{2b})_c$—O—$(C_eF_{2e})$—$SO_2X''$ or $CF_2=CF(CF_2)_a$—$(OC_bF_{2b})_c$—O—$(C_eF_{2e})$—$SO_2X'$, in any of their embodiments described above, based on the total amount of components that are copolymerized. In some embodiments, the components comprise up to 25 or 20 mole percent of a compound represented by formula $CF_2=CF(CF_2)_a$—$(OC_bF_{2b})_c$—O—$(C_eF_{2e})$—$SO_2X''$ or $CF_2=CF(CF_2)_a$—$(OC_bF_{2b})_c$—O—$(C_eF_{2e})$—$SO_2X'$, based on the total amount of components that are copolymerized.

The molecular weights of copolymers of the present disclosure can be characterized by the melt viscosity or the melt flow index (MFI, e.g., 265° C./5 kg) of a variation of the copolymer in which X is F. In some embodiments, the copolymer of the present disclosure has an MFI of up to 80 grams per 10 minutes, 70 grams per 10 minutes, 60 grams per 10 minutes, 50 grams per 10 minutes, up to 40 grams per 10 minutes, 30 grams per 10 minutes, or 20 grams per 10 minutes. In some embodiments, the copolymer of the present disclosure has an MFI of up to 15 grams per 10 minutes or up to 12 grams per 10 minutes. When the MFI is up to 80, 70, 60, 50, 40, 30, 20, 15, or 12 grams per 10 minutes, good mechanical properties are achieved. The copolymer can be adjusted to have an MFI of up to 80 grams per 10 minutes by adjusting the amount of the initiator and/or chain-transfer agent used during polymerization, both of which affect the molecular weight and molecular-weight distribution of the copolymer. MFI can also be controlled by the rate of addition of initiator to the polymerization. Variations in the monomer composition can also affect the MFI. For the purposes of the present disclosure, MFI is measured according to the test method described in the Examples, below. It should be noted that an MFI of about 20 grams per 10 minutes measured at 270° C./2.16 kg will give an MFI of 43 grams per 10 minutes measured at 265° C./5 kg. In general, when an MFI is measured at 265° C./5 kg, a value of more than twice than an MFI measured at 270° C./2.16 kg is obtained.

In some embodiments, copolymers of the present disclosure are ionomers (e.g., when X is other than F). Ionomers typically exhibit a thermal transition between a state in which the ionic clusters are closely associated and a state in which the interactions between those clusters have been weakened. This transition is described as an alpha transition, and the transition temperature is T(α). Ionomers with higher T(α) typically have greater mechanical integrity at elevated temperatures than corresponding materials with lower T(α). As a result, to obtain high service temperatures for an ionomer, a relatively high T(α) can be desirable for ionomers. In some embodiments, the α-dispersion temperature T(α) of copolymers of the present disclosure is at least 95° C., 100° C., 105° C., 110° C., or 115° C. However, we have found that decreasing the T(α) can increase oxygen permeability and that selecting a T(α) to obtain a balance of mechanical integrity and oxygen permeability can be useful. In some embodiments, the α-dispersion temperature [T(α)] of copolymer of the present disclosure is up to 110° C., 105° C., or 100° C., or less than 100° C., in some embodiments, up to 99.5° C. or 99° C. In some embodiments, the α-dispersion temperature [T(α)] of copolymer of the present disclosure is at least room temperature (e.g., 25° C.), in some embodiments, at least 60° C., 65° C., 70° C., 75° C., 80° C., 85° C., 90° C., or 95° C. In some embodiments, the α-dispersion temperature [T(α)] of copolymer of the present disclosure is in a range from 60° C. to 100° C., 70° C. to 100° C., 80° C. to 100° C., 90° C. to 100° C., or 95° C. to 100° C. In some embodiments, the α-dispersion temperature [T(α)] of copolymer of the present disclosure is in a range from 60° C. to 99.5° C., 70° C. to 99.5° C., 80° C. to 99.5° C., 90° C. to 99.5° C., or 95° C. to 99.5° C. In some embodiments, the α-dispersion temperature [T(α)] of copolymer of the present disclosure is in a range from 60° C. to 99° C., 70° C. to 99° C., 80° C. to 99° C., 90° C. to 99° C., or 95° C. to 99° C. In the copolymers of the present disclosure, various factors can affect the [T(α)]. For example, when a, b, c, and e are selected to provide greater than 2, at least 3, or at least 4 carbon atoms in the side chain of the sulfonyl-substituted divalent units a T(α) up to 100° C. (e.g., in a range from 80° C. to 100° C., 90° C. to 100° C., or 95° C. to 100° C.) may be achieved. Also, when m, m', n, z, Rf, and $Rf_i$ are selected to provide greater than 2, at least 3, or at least 4 carbon atoms and/or at least one or 2 oxygen atoms in the side chain of the divalent units represented by formula

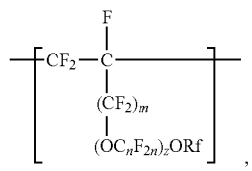

a T(α) up to 100° C. (e.g., in a range from 80° C. to 100° C., 90° C. to 100° C., or 95° C. to 100° C.) may be achieved. Including more than 3, 4, 4.5, 5, or 7.5 mol percent of these divalent units can be useful for achieving a T(α) in these ranges. Also, the cation present in the ionomer affects the T(α). Thus, T(α) in the copolymer of the present disclosure can be changed, for example, by ion exchange.

Dynamic mechanical analysis (DMA) is a useful tool for measuring T(α), as polymer physical property changes accompany this transition. The DMA sample cell may be set up in torsion, compression, or tension. For the purposes of this disclosure, T(α) is measured by the method described in the Examples, below. Since the T(α) changes with different cations, for the purposes of this disclosure, the T(α) is understood to be the T(α) when Z is hydrogen.

The glass transition temperature (Tg) is typically defined as the temperature at which an amorphous polymer or amorphous region within a polymer transitions from a glassy material (below Tg) to a rubbery one (above Tg). Gas diffusion rates are correlated to free volume in a polymer [see, for example, Diffusion in Polymers, Marcel Dekker (New York), 1996, edited by P. Neogi]. The free volume increases with temperature, particularly so above the Tg of the polymer. The molecular transport of a gas is enhanced the more the temperature of operation exceeds the Tg of the polymer. As a result, polymers having a relatively low Tg can be desirable for applications in which gas diffusion is required. In some embodiments, in the copolymers of the present disclosure, a, b, c, and e may be selected to provide greater than 2, at least 3, or at least 4 carbon atoms in the side chain of the sulfonyl-substituted divalent units to achieve a lower Tg. In some embodiments, the copolymer in which X is F has a Tg less than 30° C., less than room temperature, or up to 25° C., 20° C., 15° C., or 10° C. Since multiple bulk physical properties of the polymer are different in the glassy state relative to the rubbery state, a variety of methods can be used to measure the Tg. Differential scanning calorimetry (DSC) and dilatometry detect changes in the heat capacity and thermal expansion of the polymer in the two states, while methods such as thermal mechanical analysis (TMA) and dynamic mechanic analysis (DMA) detect differences in the physical properties in the two states. For the purposes of this disclosure, Tg is measured by the method described in the Examples, below.

In some embodiments, the copolymer of the present disclosure has at least one of a relative high T(α) (e.g., at least 100° C., 105° C., 110° C., 115° C., 120° C., or 125° C.) or a relative low Tg (e.g., up to 25° C., 20° C., 15° C., or 10° C.). In some embodiments, the copolymer of the present disclosure has at least one of a relative low T(α) (e.g., up to 110° C., 105° C., or 100° C.) or a relative low Tg (e.g., up to 25° C., 20° C., 15° C., or 10° C.). In some embodiments, the copolymer of the present disclosure has both a relative high T(α) (e.g., at least 100° C., 105° C., 110° C., 115° C., 120° C., or 125° C.) and a relative low Tg (e.g., up to 25° C., 20° C., 15° C., or 10° C.). In some embodiments, the copolymer of the present disclosure has both a relative low T(α) (e.g., up to 110° C., 105° C., or 100° C.) and a relative low Tg (e.g., up to 25° C., 20° C., 15° C., or 10° C.).

High oxygen permeability in the copolymers disclosed herein can be useful to improve the efficiency of fuel cells, for example. Copolymers of the present disclosure typically have useful oxygen permeabilities for fuel cell applications. Oxygen permeability can be measured by methods known in the art including the time lag method described in the Examples, below.

The methods of making the copolymer can be carried out by free-radical polymerization. Conveniently, in some embodiments, the methods of making the copolymer disclosed herein includes radical aqueous emulsion polymerization.

In some embodiments of the method of making the copolymer, a water-soluble initiator (e.g., potassium permanganate or a peroxy sulfuric acid salt) can be useful to start the polymerization process. Salts of peroxy sulfuric acid, such as ammonium persulfate or potassium persulfate, can be applied either alone or in the presence of a reducing agent, such as bisulfites or sulfinates (e.g., fluorinated sulfinates disclosed in U.S. Pat. Nos. 5,285,002 and 5,378,782, both to Grootaert) or the sodium salt of hydroxy methane sulfinic acid (sold under the trade designation "RON-GALIT", BASF Chemical Company, New Jersey, USA). The choice of initiator and reducing agent, if present, will affect the end groups of the copolymer. The concentration range for the initiators and reducing agent can vary from 0.001% to 5% by weight based on the aqueous polymerization medium.

In some embodiments of the method of making the copolymer, —$SO_2X$ end groups are introduced in the copolymers according to the present disclosure by generating $SO_3^-$ radicals during the polymerization process. When salts of peroxy sulfuric acid are used in the presence of a sulfite or bisulfite salt (e.g., sodium sulfite or potassium sulfite), $SO_3^-$ radicals are generated during the polymerization process, resulting in —$SO_3^-$ end groups. It might be useful to add metal ions to catalyze or accelerate the formation of —$SO_3^-$ radicals. By altering the stoichiometry of the sulfite or bisulfite salt versus the peroxy sulfuric acid salt, one can vary the amount of —$SO_2X$ end groups.

Most of the initiators described above and any emulsifiers that may be used in the polymerization have an optimum pH-range where they show most efficiency. Also, a pH can be selected for the method according to the present disclosure such that the polymerization is carried out with the salt form of the compound of formula $CF_2=CF(CF_2)_a$—$(OC_bF_{2b})_c$—O—$(C_eF_{2e})$—$SO_2X'$, wherein $X'$ is an alkali metal cation or an ammonium cation, and to maintain the salt form of the copolymer. For these reasons, buffers may be useful. Buffers include phosphate, acetate, or carbonate (e.g., $(NH_4)_2CO_3$ or $NaHCO_3$) buffers or any other acid or base, such as ammonia or alkali-metal hydroxides. In some embodiments, the copolymerizing is carried out at a pH of at least 8, higher than 8, at least 8.5, or at least 9. The concentration range for the initiators and buffers can vary from 0.01% to 5% by weight based on the aqueous polymerization medium. In some embodiments, ammonia is added to the reaction mixture in an amount to adjust the pH to at least 8, higher than 8, at least 8.5, or at least 9.

Typical chain-transfer agents like $H_2$, lower alkanes, alcohols, ethers, esters, and $CH_2Cl_2$ may be useful in the preparation of the copolymer and ionomer according to the present disclosure. Termination primarily via chain-transfer results in a polydispersity of about 2.5 or less. In some embodiments of the method according to the present disclosure, the polymerization is carried out without any chain-transfer agents. A lower polydispersity can sometimes be achieved in the absence of chain-transfer agents. Recombination typically leads to a polydispersity of about 1.5 for small conversions.

Useful polymerization temperatures can range from 20° C. to 150° C. Typically, polymerization is carried out in a temperature range from 30° C. to 120° C., 40° C. to 100° C., or 50° C. to 90° C. The polymerization pressure is usually in the range of 0.4 MPa to 2.5 MPa, 0.6 to 1.8 MPa, 0.8 MPa to 1.5 MPa, and in some embodiments is in the range from 1.0 MPa to 2.0 MPa. Fluorinated monomers such as HFP can be precharged and fed into the reactor as described, for example, in Modern Fluoropolymers, ed. John Scheirs, Wiley & Sons, 1997, p. 241. Perfluoroalkoxyalkyl vinyl ethers represented by formula $CF_2=CF(OC_nF_{2n})_zORf$ and perfluoroalkoxyalkyl allyl ethers represented by formula $CF_2=CFCF_2(OC_nF_{2n})_zORf$, wherein n, z, and Rf are as defined above in any of their embodiments, are typically liquids and may be sprayed into the reactor or added directly, vaporized, or atomized.

Conveniently, in some embodiments of the method of making the copolymer, the polymerization process may be conducted with no emulsifier (e.g., no fluorinated emulsifier). Surprisingly, we have found that even with the incorporation of liquid perfluoroalkoxyalkyl vinyl or perfluoroalkoxyalkyl allyl ethers or bisolefins in larger amounts, no fluorinated emulsifier is needed to ensure proper incorporation of these monomers. It can be useful to feed the compound represented by formula $CF_2=CF(CF_2)_a$—$(OC_bF_{2b})_c$—O—$(C_eF_{2e})$—$SO_2X''$ and the non-functional comonomers (e.g., perfluoroalkoxyalkyl vinyl or perfluoroalkoxyalkyl allyl ethers or bisolefins) as a homogenous mixture to the polymerization. In some embodiments, it is possible to hydrolyze some of the $CF_2=CF(CF_2)_a$—$(OC_bF_{2b})_c$—O—$(C_eF_{2e})$—$SO_2F$ (e.g., up to 5 ppm) to obtain an "in situ"-emulsifier. Advantageously, this method may be conducted in the absence of any other fluorinated emulsifiers.

In some embodiments, however, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 500 nm, and in some embodiments in range of about 50 nm to about 300 nm. Examples of suitable emulsifiers include perfluorinated and partially fluorinated emulsifier having the formula $[R_f$—O-L-COO$^-]_iX^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g., U.S. Pat. No. 7,671,112 to Hintzer et al.). Additional examples of suitable emulsifiers also include perfluorinated polyether emulsifiers having the formula $CF_3$—$(OCF_2)_x$—$CF_2$—$X'$, wherein x has a value of 1 to 6 and X' represents a carboxylic acid group or salt thereof, and the formula $CF_3$—O—$(CF_2)_3$—$(OCF(CF_3)$—$CF_2)_y$—O-L-Y' wherein y has a value of 0, 1, 2 or 3, L represents a divalent linking group selected from —$CF(CF_3)$—, —$CF_2$—, and —$CF_2CF_2$—, and Y' represents a carboxylic acid group or salt thereof (See, e.g., U.S. Pat. Publ. No. 2007/0015865 to Hintzer et al.). Other suitable emulsifiers include perfluorinated polyether emulsifiers having the formula Rr-O$(CF_2CF_2O)_xCF_2COOA$ wherein $R_f$ is $C_bF_{(2b+1)}$; where b is 1 to 4, A is a hydrogen atom, an alkali metal or $NH_4$, and x is an integer of from 1 to 3. (See, e.g., U.S. Pat. Publ. No. 2006/0199898 to Funaki et al.). Suitable emulsifiers also include perfluorinated emulsifiers having the formula $F(CF_2)_bO(CF_2CF_2O)_xCF_2COOA$ wherein A is a hydrogen atom, an alkali metal or $NH_4$, b is an integer of from 3 to 10, and x is 0 or an integer of from 1 to 3. (See, e.g., U.S. Pat. Publ. No. 2007/0117915 to Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g., U.S. Pat. No. 4,621,116 to Morgan). Suitable emulsifiers also include partially fluorinated polyether emulsifiers having the formula $[R_f$—(O)$_t$—CHF—$(CF_2)_x$—COO—$]_iX^{i+}$ wherein $R_f$ represents a partially or fully fluorinated aliphatic group optionally interrupted with one or more oxygen atoms, t is 0 or 1 and x is 0 or 1, $X^{i+}$ represents a cation having a valence i and i is 1, 2 or 3. (See, e.g., U.S. Pat. Publ. No. 2007/0142541 to Hintzer et al.). Further suitable emulsifiers include perfluorinated or partially fluorinated ether-containing emulsifiers as described in U.S. Pat. Publ. Nos. 2006/0223924, 2007/0060699, and 2007/0142513 each to Tsuda et al. and 2006/0281946 to Morita et al. Fluoroalkyl, for example, perfluoroalkyl carboxylic acids and salts thereof having 6-20 carbon atoms, such as ammonium perfluorooctanoate (APFO) and ammonium perfluorononanoate (see, e.g., U.S. Pat. No. 2,559,752 to Berry) may also be useful. Conveniently, in some embodiments, the method of making the copolymer according to the present disclosure may be conducted in the absence of any of these emulsifiers or any combination thereof.

If fluorinated emulsifiers are used, the emulsifiers can be removed or recycled from the fluoropolymer latex, if desired, as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al., and 7,018,541 to Hintzer et al.

In some embodiments, the obtained copolymer latices are purified by at least one of anion- or cation-exchange processes to remove functional comonomers, anions, and/or cations before coagulation or spray drying (described below). As used herein, the term "purify" refers to at least partially removing impurities, regardless of whether the removal is complete. Anionic species that may constitute impurities include, for example, fluoride, anionic residues from surfactants and emulsifiers (e.g., perfluorooctanoate), and residual compounds represented by formula $CF_2=CF(CF_2)_a-(OC_bF_{2b})_c-O-(C_eF_{2e})-SO_2X'$. It should be noted, however, that it may be desirable to not remove ionic fluoropolymer from the dispersion. Useful anion exchange resins typically comprise a polymer (typically crosslinked) that has a plurality of cationic groups (e.g., quaternary alkyl ammonium groups) paired with various anions (e.g., halide or hydroxide). Upon contact with the fluoropolymer dispersion, anionic impurities in the dispersion become associated with the anion exchange resin. After the anion exchange step, the resultant anion-exchanged dispersion is separated from the anion exchange resin, for example, by filtration. It was reported in U.S. Pat. No. 7,304,101 (Hintzer et al.) that the anionic hydrolyzed fluoropolymer does not appreciably become immobilized on the anion exchange resin, which would lead to coagulation and/or material loss. Anionic exchange resins are available commercially from a variety of sources. If the anion exchange resin is not in the hydroxide form it may be at least partially or fully converted to the hydroxide salt form before use. This is typically done by treating the anion exchange resin with an aqueous ammonia or sodium hydroxide solution. Typically, better yields are obtained using gel-type anion-exchange resins than with macroporous anion exchange resins.

Examples of cationic impurities resulting from the above-mentioned polymerization include one or more of, alkali metal cation(s) (e.g., $Li^+$, $Na^+$, $K^+$), ammonium, quaternary alkyl ammonium, alkaline earth cations (e.g., $Mg^{2+}$, $Ca^{2+}$), manganese cations (e.g. $Mn^{2+}$), and Group III metal cations. Useful cation exchange resins include polymers (typically cross-linked) that have a plurality of pendant anionic or acidic groups such as, for example, polysulfonates or polysulfonic acids, polycarboxylates or polycarboxylic acids. Examples of useful sulfonic acid cation exchange resins include sulfonated styrene-divinylbenzene copolymers, sulfonated crosslinked styrene polymers, phenol-formaldehyde-sulfonic acid resins, and benzene-formaldehyde-sulfonic acid resins. Carboxylic acid cation exchange resin is an organic acid, cation exchange resin, such as carboxylic acid cation exchange resin. Cation exchange resins are available commercially from a variety of sources. Cation exchange resins are commonly supplied commercially in either their acid or their sodium form. If the cation exchange resin is not in the acid form (i.e., protonated form) it may be at least partially or fully converted to the acid form in order to avoid the generally undesired introduction of other cations into the dispersion. This conversion to the acid form may be accomplished by means well known in the art, for example by treatment with any adequately strong acid.

If purification of the copolymer latex is carried out using both anion and cation exchange processes, the anion exchange resin and cation exchange resin may be used individually or in combination as, for example, in the case of a mixed resin bed having both anion and cation exchange resins.

To coagulate the obtained copolymer latex, any coagulant which is commonly used for coagulation of a fluoropolymer latex may be used, and it may, for example, be a water-soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in a range of 0.001 to 20 parts by mass, for example, in a range of 0.01 to 10 parts by mass per 100 parts by mass of the latex. Alternatively or additionally, the latex may be frozen for coagulation or mechanically coagulated, for example, with a homogenizer as described in U.S. Pat. No. 5,463,021 (Beyer et al.). Alternatively or additionally, the latex may be coagulated by adding polycations. It may also be useful to avoid acids and alkaline earth metal salts as coagulants to avoid metal contaminants. To avoid coagulation altogether and any contaminants from coagulants, spray drying the latex after polymerization and optional ion-exchange purification may be useful to provide solid copolymer.

A coagulated copolymer can be collected by filtration and washed with water. The washing water may, for example, be ion-exchanged water, pure water, or ultrapure water. The amount of the washing water may be from 1 to 5 times by mass to the copolymer or ionomer, whereby the amount of the emulsifier attached to the copolymer can be sufficiently reduced by one washing.

The copolymer produced can have less than 50 ppm metal ion content, in some embodiments, less than 25 ppm, less than 10 ppm, less than 5 ppm, or less than 1 ppm metal ion content. Specifically, metal ions such as alkali metals, alkaline earth metal, heavy metals (e.g., nickel, cobalt, manganese, cadmium, and iron) can be reduced. To achieve a metal ion content of less than 50 ppm, 25 ppm, 10 ppm. 5 ppm, or 1 ppm, polymerization can be conducted in the absence of added metal ions. For example, potassium persulfate, a common alternative initiator or co-initiator with ammonium persulfate, is not used, and mechanical and freeze coagulation described above may be used instead of coagulation with metal salts. It is also possible to use organic initiators as disclosed in U.S. Pat. No. 5,182,342 (Feiring et al.). To achieve such low ion content, ion exchange can be used, as described above, and the water for polymerization and washing may be deionized.

The metal ion content of the copolymer can be measured by flame atomic absorption spectrometry after combusting the copolymer and dissolving the residue in an acidic aqueous solution. For potassium as the analyte, the lower detection limit is less than 1 ppm.

In some embodiments of the methods of making the copolymer, radical polymerization also can be carried out by suspension polymerization. Suspension polymerization will typically produce particle sizes up to several millimeters.

A method for making the copolymer disclosed herein can include copolymerizing components including $SO_2F$-containing vinyl and allyl ethers (e.g., $CF_2=CF(CF_2)_a-(OC_bF_{2b})_c-O-(C_eF_{2e})-SO_2F$), isolating a solid from the polymer dispersion, hydrolyzing the polymer, optionally purifying the polymer by ion exchange purification, and drying the resulting polymer. In some embodiments, the method of making the copolymer includes copolymerizing components including at least one compound represented by formula $CF_2=CF(CF_2)_a-(OC_bF_{2b})_c-O-(C_eF_{2e})-SO_2X'$, optionally purifying the copolymer by ion-exchange purification, and spray drying the resulting dispersion. This method can conveniently eliminate the steps of isolating solid polymer and hydrolyzing, resulting in a more efficient and cost-effective process.

The components to be polymerized in the methods according to the present disclosure can include more than one compound represented by formula $CF_2=CF(CF_2)_a-(OC_bF_{2b})_c-O-(C_eF_{2e})-SO_3Z$. When more than one compound represented by formula $CF_2=CF(CF_2)_a-(OC_bF_{2b})_c-O-(C_eF_{2e})-SO_3Z$ is present, each of a, b, c, e, and Z may be independently selected. In some of these embodiments, each Z is independently an alkali-metal cation or a quaternary ammonium cation.

In some cases, compounds represented by formula $CF_2=CF(CF_2)_a-(OC_bF_{2b})_c-O-(C_eF_{2e})-SO_3Z$ are not prepared in situ from compounds represented by formula $CF_2=CF(CF_2)_a-(OC_bF_{2b})_c-O-(C_eF_{2e})-SO_2F$.

In some embodiments, the components to be polymerized in the method disclosed herein are substantially free of compounds represented by formula $CF_2=CF(CF_2)_a-(OC_bF_{2b})_c-O-(C_eF_{2e})-SO_2F$. In this regard, "substantially free of" compounds represented by formula $CF_2=CF(CF_2)_a-(OC_bF_{2b})_c-O-(C_eF_{2e})-SO_2F$ may mean that the components to be polymerized in the method disclosed herein are free of compounds represented by formula $CF_2=CF(CF_2)_a-(OC_bF_{2b})_c-O-(C_eF_{2e})-SO_2F$ or that such compounds are present in an amount of up to 5, 4, 3, 2, 1, 0.5, 0.1, 0.05, or 0.01 mole percent, based on the total amount of components.

In other embodiments, a copolymer of the present disclosure can be made by copolymerizing a compound represented by formula $CF_2=CF(CF_2)_a-(OC_bF_{2b})_c-O-(C_eF_{2e})-SO_2F$ and other fluorinated monomers as described above in any of their embodiments. In these embodiments, it is possible to hydrolyze some of the $CF_2=CF(CF_2)_a-(OC_bF_{2b})_c-O-(C_eF_{2e})-SO_2F$ (e.g., up to 5 ppm) to obtain an "in situ"-emulsifier as above.

Fluoropolymers obtained by aqueous emulsion polymerization with inorganic initiators (e.g. persulfates, $KMnO_4$, etc.) typically have a high number of unstable carbon-based end groups (e.g. more than 200 —COOM or —COF end groups per $10^6$ carbon atoms, wherein M is hydrogen, a metal cation, or $NH_2$). For fluorinated ionomers useful, for example, in an electrochemical cell, the effect naturally increases as sulfonate equivalent weight decreases. These carbonyl end groups are vulnerable to peroxide radical attacks, which reduce the oxidative stability of the fluorinated ionomers. During operation of a fuel cell, electrolysis cell, or other electrochemical cell, peroxides can be formed. This degrades the fluorinated ionomers, and correspondingly reduces the operational life of the given electrolyte membrane.

As polymerized, the copolymer of the present disclosure can have up to 400 —COOM and —COF end groups per $10^6$ carbon atoms, wherein M is independently an alkyl group, a hydrogen atom, a metallic cation, or a quaternary ammonium cation. Advantageously, in some embodiments, the copolymer according to the present disclosure has up to 200 unstable end groups per $10^6$ carbon atoms. The unstable end groups are —COOM or —COF groups, wherein M is an alkyl group, a hydrogen atom, a metallic cation, or a quaternary ammonium cation. In some embodiments, the copolymer has up to 150, 100, 75, 50, 40, 30, 25, 20, 15, or 10 unstable end groups per $10^6$ carbon atoms. The number of unstable end groups can be determined by Fourier-transform infrared spectroscopy using the method described below. In some embodiments, the copolymer according to the present disclosure has up to 50 (in some embodiments, up to 40, 30, 25, 20, 15, or 10) unstable end groups per $10^6$ carbon atoms, as polymerized.

Copolymers according to some embodiments of the present disclosure have —$SO_2X$ end groups. As described above, —$SO_2X$ end groups can be introduced in the copolymers according to the present disclosure by generating $SO_3$ radicals during the polymerization process.

In some embodiments, reducing the number of unstable end groups can be accomplished by carrying out the polymerization in the methods disclosed above in the presence of a salt or pseudohalogen as described in U.S. Pat. No. 7,214,740 (Lochhaas et al.). Suitable salts can include a chloride anion, a bromide anion, an iodide anion, or a cyanide anion and a sodium, potassium, or ammonium cation. The salt used in the free-radical polymerization may be a homogenous salt or a blend of different salts. Examples of useful pseudohalogens are nitrile-containing compounds, which provide nitrile end groups. Pseudohalogen nitrile-containing compounds have one or more nitrile groups and function in the same manner as compounds in which the nitrile groups are replaced with a halogen. Examples of suitable pseudohalogen nitrile-containing compounds include NC—CN, NC—S—S—CN, NCS—CN, Cl—CN, Br—CN, I—CN, NCN=NCN, and combinations thereof. During the free-radical polymerization, the reactive atoms/groups of the salts or the nitrile groups of the pseudohalogens chemically bond to at least one end of the backbone chain of the fluoropolymer. This provides $CF_2Y^1$ end groups instead of carbonyl end groups, wherein $Y^1$ is chloro, bromo, iodo, or nitrile. For example, if the free-radical polymerization is performed in the presence of a KCl salt, at least one of the end groups provided would be a —$CF_2Cl$ end group. Alternatively, if the free-radical polymerization is performed in the presence of a NC—CN pseudohalogen, at least one of the end groups provided would be a —$CF_2CN$ end group.

Post-fluorination with fluorine gas can also be used to cope with unstable end groups and any concomitant degradation. Post-fluorination of the fluoropolymer can convert —COOH, amide, hydride, —COF, —$CF_2Y^1$ and other non-perfluorinated end groups or —CF=$CF_2$ to —$CF_3$ end groups. The post-fluorination may be carried out in any convenient manner. The post-fluorination can be conveniently carried out with nitrogen/fluorine gas mixtures in ratios of 75-90:25-10 at temperatures between 20° C. and 250° C., in some embodiments in a range of 150° C. to 250° C. or 70° C. to 120° C., and pressures from 10 KPa to 1000 KPa. Reaction times can range from about four hours to about 16 hours. Under these conditions, most unstable carbon-based end groups are removed, whereas —$SO_2X$ groups mostly survive and are converted to —$SO_2F$ groups. In some embodiments, post-fluorination is not carried out when non-fluorinated monomers described above are used as monomers in the polymerization or when the copolymer according to the present disclosure includes divalent units independently represented by formula:

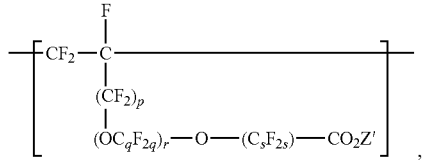

as described above in any of their embodiments.

The groups $Y^1$ in the end groups —$CF_2Y^1$, described above, are reactive to fluorine gas, which reduces the time and energy required to post-fluorinate the copolymers in these embodiments. We have also found that the presence of alkali-metal cations in the copolymer increases the decomposition rate of unstable carboxylic end-groups and therefore makes a subsequent post-fluorination step, if needed, easier, faster, and cheaper.

For copolymers in which the —$SO_2X$ groups are —$SO_2F$ groups, the copolymer can be treated with an amine (e.g., ammonia) to provide a sulfonamide (e.g., having —$SO_2NH_2$ groups). Sulfonamides made in this manner or prepared by using $CF_2$=$CFCF_2$—$(OC_bF_{2b})_c$—O—$(CF_2)_e$—$SO_2NH_2$ in the components that are polymerized as described above can be further reacted with multi-functional sulfonyl fluoride or sulfonyl chloride compounds. Examples of useful multi-functional compounds include 1,1,2,2-tetrafluoroethyl-1,3-disulfonyl fluoride; 1,1,2,2,3,3-hexafluoropropyl-1,3-disulfonyl fluoride; 1,1,2,2,3,3,4,4-octafluorobutyl-1,4-disulfonyl fluoride; 1,1,2,2,3,3,4,4,5,5-perfluoropentyl-1,5-disulfonyl fluoride; 1,1,2,2-tetrafluoroethyl-1,2-disulfonyl chloride; 1,1,2,2,3,3-hexafluoropropyl-1,3-disulfonyl chloride; 1,1,2,2,3,3,4,4-octafluorobutyl-1,4-disulfonyl chloride; and 1,1,2,2,3,3,4,4,5,5-perfluoropentyl-1,5-disulfonyl chloride. After hydrolysis of the sulfonyl halide groups, the resulting copolymer, in which X is —$NZSO_2(CF_2)_{1-6}SO_3Z$, can have a higher number of ionic groups than the copolymer as polymerized. Thus, the number of ionic groups can be increased and the equivalent weight decreased without affecting the backbone structure of the copolymer. Also, using a deficient amount multi-functional sulfonyl fluoride or sulfonyl chloride compounds can result in crosslinking of the polymer chains, which may be useful to improve durability in some cases (e.g., for copolymers having low equivalent weights). Further details can be found, for example, in U.S. Pat. Appl. Publ. No. 20020160272 (Tanaka et al.). To prevent such crosslinking, if desired, copolymers bearing —$SO_2NH_2$ groups can be treated with compounds represented by formula $FSO_2(CF_2)_{1-6}SO_3H$, which can be made by hydrolyzing any of the multi-functional sulfonyl fluorides or sulfonyl chlorides described above with one equivalent of water in the presence of base (e.g., N,N-diisopropylethylamine (DIPEA)) as described in JP 2011-40363, published Feb. 24, 2011. Copolymers bearing —$SO_2NH_2$ groups can also treated with polysulfonimides represented by formula $FSO_2(CF_2)_a[SO_2NZSO_2(CF_2)_a]_{1-10}SO_2F$ or $FSO_2(CF_2)_a[SO_2NZSO_2(CF_2)_a]_{1-10}SO_3H$, wherein each a is independently 1 to 6, 1 to 4, or 2 to 4. To make a polysulfonimide, a sulfonyl halide monomer (e.g., any of those described above) and a sulfonamide monomer represented by formula $H_2NSO_2(CF_2)_aSO_2NH_2$ are made to react in the mole ratio of (k+1)/k, in which k represents the moles of sulfonamide monomer and k+1 represents the moles of sulfonyl halide monomer. The reaction may be carried out, for example, in a suitable solvent (e.g., acetonitrile) at 0° C. in the presence of base. The sulfonyl halide monomer and sulfonamide monomer may have the same or different values of a, resulting in the same or different value of a for each repeating unit. The resulting product (e.g., $FSO_2(CF_2)_a[SO_2NZSO_2(CF_2)_a]_{1-10}SO_2F$) may be treated with one equivalent of water in the presence of base (e.g., N,N-diisopropylethylamine (DIPEA)) to provide, for example, $FSO_2(CF_2)_a[SO_2NZSO_2(CF_2)_a]_{1-10}SO_3H$, as described in JP 2011-40363.

In other embodiments, copolymers in which the —$SO_2X$ groups are —$SO_2F$ groups can be treated with small molecule sulfonamides such as those represented by formula $NH_2SO_2(CF_2)_{1-6}SO_3Z$, wherein Z is as defined above in any of its embodiments, to provide —$SO_2NHSO_2(CF_2)_{1-6}SO_3Z$ groups. Compounds represented by formula $NH_2SO_2(CF_2)_{1-6}SO_3Z$ may be synthesized by reacting cyclic perfluorodisulfonic acid anhydrides with amines according to the methods described in U.S. Pat. No. 4,423,197 (Behr). This can also provide copolymers with very low equivalent weights.

Some conventional fluoropolymers can be difficult to disperse. A technique that can be useful for dispersing a fluoropolymer in a desired medium is up-concentration of a dilute dispersion of fluoropolymer. For example, U.S. Pat. Appl. Pub. Nos. 2017/0183435 (Ino) reports preparing a fluoropolymer electrolyte solution by heating a solid fluoropolymer electrolyte in a solution of 50% by weight solution of ethanol in water in an autoclave at 160° C. with stirring for five hours to achieve a fluoropolymer electrolyte solution with a solids concentration of 5% by weight. Concentration under reduced pressure provided a fluoropolymer electrolyte solution with a solids concentration of 20% by weight.

By contrast, the copolymer disclosed herein can typically be directly dispersed at a concentration of at least 10, 15, 20, or 25 percent by weight in a solution of water and organic solvent without the need for up-concentrating. In some embodiments, the copolymer disclosed herein can be directly dispersed at a concentration of up to 30, 40, or 50 percent by weight in a solution of water and organic solvent without the need for up-concentrating. A useful method includes combining components comprising water, an organic solvent, and at least ten percent by weight of the copolymer of the present disclosure, based on the total weight of the components, and mixing the components at ambient temperature and pressure to make a fluoropolymer dispersion. In this method, it should be understood that combining components comprising at least ten percent by weight of the copolymer, based on the total weight of the components, refers to the concentration of the copolymer when the components are initially combined (e.g., when organic solvent is first added to an aqueous dispersion of the fluoropolymer) before any agitation of the combined components. In some embodiments of this method, X is OZ, and Z is hydrogen. Examples of suitable organic solvents useful for preparing fluoropolymer dispersions of the copolymer of the present disclosure include, lower alcohols (e.g., methanol, ethanol, isopropanol, n-propanol), polyols (e.g., ethylene glycol, propylene glycol, glycerol), ethers (e.g., tetrahydrofuran and dioxane), diglyme, polyglycol ethers, ether acetates, acetonitrile, acetone, dimethylsulfoxide (DMSO), N,N dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof. In some embodiments, the copolymer, water, and organic solvent can be heated at a pressure of up to 0.2 MPa or 0.15 MPa at a temperature of up to 100° C., 90° C., 80° C., 70° C., 60° C., 50° C., or 40° C. Advantageously, the fluoropolymer dispersion may also be made at ambient temperature and pressure.

The copolymer of the present disclosure may be useful, for example, in the manufacture of catalyst ink and polymer electrolyte membranes for use in fuel cells or other electrolytic cells. A membrane electrode assembly (MEA) is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. Details concerning the preparation of catalyst inks and their use in membrane assemblies can be found, for example, in U.S. Pat. Publ. No. 2004/0107869 (Velamakanni et al.). In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The copolymer of the present disclosure may be useful as and/or useful for making a catalyst ink composition. In some embodiments, the copolymer (e.g., as a component of the fluoropolymer dispersion described above) can be combined with catalyst particles (e.g., metal particles or carbon-supported metal particles). A variety of catalysts may be useful. Typically, carbon-supported catalyst particles are used. Typical carbon-supported catalyst particles are 50% to 90% carbon and 10% to 50% catalyst metal by weight, the catalyst metal typically comprising platinum for the cathode and platinum and ruthenium in a weight ratio of 2:1 for the anode. However, other metals may be useful, for example, gold, silver, palladium, iridium, rhodium, ruthenium, iron, cobalt, nickel, chromium, tungsten, manganese, vanadium, and alloys thereof. To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications. Advantageously, copolymers according to the present disclosure may be useful for making a catalyst layer with one coating application. The catalyst ink may be applied to a PEM or a GDL directly, or the catalyst ink may be applied to a transfer substrate, dried, and thereafter applied to the PEM or to the FTL as a decal.

In some embodiments, the catalyst ink includes the copolymer disclosed herein at a concentration of at least 10, 15, or 20 percent by weight and up to 30 percent by weight, based on the total weight of the catalyst ink. In some embodiment, the catalyst ink includes the catalyst particles in an amount of at least 10, 15, or 20 percent by weight and up to 50, 40, or 30 percent by weight, based on the total weight of the catalyst ink. The catalyst particles may be added to the fluoropolymer dispersion made as described above in any of its embodiments. The resulting catalyst ink may be mixed, for example, with heating. The percent solid in the catalyst ink may be selected, for example, to obtain desirable rheological properties. Examples of suitable organic solvents useful for including in the catalyst ink include, lower alcohols (e.g., methanol, ethanol, isopropanol, n-propanol), polyols (e.g., ethylene glycol, propylene glycol, glycerol), ethers (e.g., tetrahydrofuran and dioxane), diglyme, polyglycol ethers, ether acetates, acetonitrile, acetone, dimethylsulfoxide (DMSO), N,N dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof. In some embodiments, the catalyst ink contains 0% to 50% by weight of a lower alcohol and 0% to 20% by weight of a polyol. In addition, the ink may contain 0% to 2% of a suitable dispersant.

In some embodiments, the copolymer of the present disclosure may be useful for making a polymer electrolyte membrane. The copolymer may be formed into a polymer electrolyte membrane by any suitable method, including casting, molding, and extrusion. Typically, the membrane is cast from a fluoropolymer dispersion (e.g., those described above in any of their embodiments) and then dried, annealed, or both. The copolymer may be cast from a suspension. Any suitable casting method may be used, including bar coating, spray coating, slit coating, and brush coating. After forming, the membrane may be annealed, typically at a temperature of 120° C. or higher, more typically 130° C. or higher, most typically 150° C. or higher. In some embodiments of the method according to the present disclosure, a polymer electrolyte membrane can be obtained by obtaining the copolymer in a fluoropolymer dispersion, optionally purifying the dispersion by ion-exchange purification, and concentrating the dispersion to make a membrane. Typically, if the fluoropolymer dispersion is to be used to form a membrane, the concentration of copolymer is advantageously high (e.g., at least 20, 30, or 40 percent by weight). Often a water-miscible organic solvent is added to facilitate film formation. Examples of water-miscible solvents include, lower alcohols (e.g., methanol, ethanol, isopropanol, n-propanol), polyols (e.g., ethylene glycol, propylene glycol, glycerol), ethers (e.g., tetrahydrofuran and dioxane), ether acetates, acetonitrile, acetone, dimethylsulfoxide (DMSO), N,N dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof.

The present disclosure provides a membrane electrode assembly comprising at least one of a catalyst ink comprising the copolymer of the present disclosure or a polymer electrolyte membrane comprising the copolymer of the present disclosure. In some embodiments, the polymer electrolyte membrane and catalyst ink use embodiments of the copolymer disclosed herein. The catalyst ink and polymer electrolyte membrane may use the same or different copolymers. In some embodiments, the catalyst ink comprises the copolymer of the present disclosure, and the polymer electrolyte membrane includes a conventional copolymer (e.g., one that does not include one or more divalent units independently represented by formula:

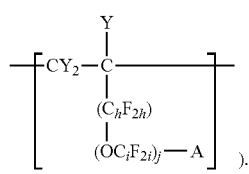

In some embodiments, the polymer electrolyte membrane is prepared from the copolymer of the present disclosure, and the catalyst ink includes a conventional copolymer (e.g., one that does not include one or more divalent units independently represented by formula:

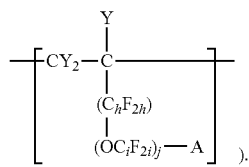

In some embodiments of the polymer electrolyte membrane of the present disclosure, a salt of at least one of cerium, manganese or ruthenium or one or more cerium oxide or zirconium oxide compounds is added to the acid form of the copolymer before membrane formation. Typically, the salt of cerium, manganese, or ruthenium and/or the cerium or zirconium oxide compound is mixed well with or dissolved within the copolymer to achieve substantially uniform distribution.

The salt of cerium, manganese, or ruthenium may comprise any suitable anion, including chloride, bromide, hydroxide, nitrate, sulfonate, acetate, phosphate, and carbonate. More than one anion may be present. Other salts may be present, including salts that include other metal cations or ammonium cations. Once cation exchange occurs between the transition metal salt and the acid form of the ionomer, it may be desirable for the acid formed by combination of the liberated proton and the original salt anion to be removed. Thus, it may be useful to use anions that generate volatile or soluble acids, for example chloride or nitrate. Manganese cations may be in any suitable oxidation state, including $Mn^{2+}$, $Mn^{3+}$, and $Mn^{4+}$, but are most typically $Mn^{2+}$. Ruthenium cations may be in any suitable oxidation state, including $Ru^{3+}$ and $Ru^{4+}$, but are most typically $Ru^{3+}$. Cerium cations may be in any suitable oxidation state, including $Ce^{3+}$ and $Ce^{4+}$. Without wishing to be bound by theory, it is believed that the cerium, manganese, or ruthenium cations persist in the polymer electrolyte because they are exchanged with $H^+$ ions from the anion groups of the polymer electrolyte and become associated with those anion groups. Furthermore, it is believed that polyvalent cerium, manganese, or ruthenium cations may form crosslinks between anion groups of the polymer electrolyte, further adding to the stability of the polymer. In some embodiments, the salt may be present in solid form. The cations may be present in a combination of two or more forms including solvated cation, cation associated with bound anion groups of the polymer electrolyte membrane, and cation bound in a salt precipitate. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Further details for combining an anionic copolymer with cerium, manganese, or ruthenium cations can be found in U.S. Pat. Nos. 7,575,534 and 8,628,871, each to Frey et al.

Useful cerium oxide compounds may contain cerium in the (IV) oxidation state, the (III) oxidation state, or both and may be crystalline or amorphous. The cerium oxide may be, for example, $CeO_2$ or $Ce_2O_3$. The cerium oxide may be substantially free of metallic cerium or may contain metallic cerium. The cerium oxide may be, for example, a thin oxidation reaction product on a metallic cerium particle. The cerium oxide compound may or may not contain other metal elements. Examples of mixed metal oxide compounds comprising cerium oxide include solid solutions such as zirconia-ceria and multicomponent oxide compounds such as barium cerate. Without wishing to be bound by theory, it is believed that the cerium oxide may strengthen the polymer by chelating and forming crosslinks between bound anionic groups. The amount of cerium oxide compound added is typically between 0.01 and 5 weight percent based on the total weight of the copolymer, more typically between 0.1 and 2 weight percent, and more typically between 0.2 and 0.3 weight percent. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, in some embodiments, between 1 nm and 5000 nm, 200 nm to 5000 nm, or 500 nm to 1000 nm. Further details regarding polymer electrolyte membranes including cerium oxide compounds can be found in U.S. Pat. No. 8,367,267 (Frey et al.).

The polymer electrolyte membrane, in some embodiments, may have a thickness of up to 90 microns, up to 60 microns, or up to 30 microns. A thinner membrane may provide less resistance to the passage of ions. In fuel cell use, this results in cooler operation and greater output of usable energy. Thinner membranes must be made of materials that maintain their structural integrity in use.

In some embodiments, the copolymer of the present disclosure may be imbibed into a porous supporting matrix, typically in the form of a thin membrane having a thickness of up to 90 microns, up to 60 microns, or up to 30 microns. Any suitable method of imbibing the copolymer into the pores of the supporting matrix may be used, including overpressure, vacuum, wicking, and immersion. In some embodiments, the copolymer is embedded in the matrix upon crosslinking. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. In another embodiment fillers (e.g. fibers) might be added to the polymer to reinforce the membrane.

To make an MEA, GDL's may be applied to either side of a CCM by any suitable means. Any suitable GDL may be used in the practice of the present disclosure. Typically, the GDL is comprised of sheet material comprising carbon fibers. Typically, the GDL is a carbon fiber construction selected from woven and non-woven carbon fiber constructions. Carbon fiber constructions which may be useful in the practice of the present disclosure may include Toray™ Carbon Paper, SpectraCarb™ Carbon Paper, AFN™ non-woven carbon cloth, and Zoltek™ Carbon Cloth. The GDL may be coated or impregnated with various materials, including carbon particle coatings, hydrophilizing treatments, and hydrophobizing treatments such as coating with polytetrafluoroethylene (PTFE).

In use, the MEA according to the present disclosure is typically sandwiched between two rigid plates, known as distribution plates, also known as bipolar plates (BPP's) or monopolar plates. Like the GDL, the distribution plate is typically electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." A typical fuel cell stack comprises a number of MEA's stacked alternately with bipolar plates.

Another type of electrochemical device is an electrolysis cell, which uses electricity to produce chemical changes or chemical energy. An example of an electrolysis cell is a chlor-alkali membrane cell where aqueous sodium chloride is electrolyzed by an electric current between an anode and a cathode. The electrolyte is separated into an anolyte portion and a catholyte portion by a membrane subject to harsh conditions. In chlor-alkali membrane cells, caustic sodium hydroxide collects in the catholyte portion, hydrogen gas is evolved at the cathode portion, and chlorine gas is evolved from the sodium chloride-rich anolyte portion at the anode. The copolymer of the present disclosure may be useful, for example, in the manufacture of catalyst ink and electrolyte membranes for use in chlor-alkali membrane cells or other electrolytic cells.

The copolymer according to the present disclosure may also be useful has a binder for an electrode in other electrochemical cells (for example, lithium ion batteries). To make electrodes, powdered active ingredients can be dispersed in a solvent with the copolymer and coated onto a metal foil substrate, or current collector. The resulting composite electrode contains the powdered active ingredient in the polymer binder adhered to the metal substrate. Useful active materials for making negative electrodes include alloys of main group elements and conductive powders such as graphite. Examples of useful active materials for making a negative electrode include oxides (tin oxide), carbon compounds (e.g., artificial graphite, natural graphite, soil black lead, expanded graphite, and scaly graphite), silicon carbide compounds, silicon-oxide compounds, titanium sulfides, and boron carbide compounds. Useful active materials for making positive electrodes include lithium compounds, such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$. The electrodes can also include electrically conductive diluents and adhesion promoters.

Electrochemical cells including the copolymer disclosed herein as a binder can be made by placing at least one each of a positive electrode and a negative electrode in an electrolyte. Typically, a microporous separator can be used to prevent the contact of the negative electrode directly with the positive electrode. Once the electrodes are connected externally, lithiation and delithiation can take place at the electrodes, generating a current. A variety of electrolytes can be employed in a lithium-ion cell. Representative electrolytes contain one or more lithium salts and a charge-carrying medium in the form of a solid, liquid, or gel. Examples of lithium salts include $LiPF_6$, $LiBF_4$, $LiClO_4$, lithium bis (oxalato)borate, $LiN(CF_3SO_2)_2$, $LiN(C_2F_5SO_2)_2$, $LiAsF_6$, $LiC(CF_3SO_2)_3$, and combinations thereof. Examples of solid charge carrying media include polymeric media such as polyethylene oxide, polytetrafluoroethylene, polyvinylidene fluoride, fluorine-containing copolymers, polyacrylonitrile, combinations thereof, and other solid media that will be familiar to those skilled in the art. Examples of liquid charge carrying media include ethylene carbonate, propylene carbonate, dimethyl carbonate, diethyl carbonate, ethyl methyl carbonate, butylene carbonate, vinylene carbonate, fluoroethylene carbonate, fluoropropylene carbonate, gamma-butyrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Examples of charge carrying media gels include those described in U.S. Pat. No. 6,387,570 (Nakamura et al.) and U.S. Pat. No. 6,780,544 (Noh). The electrolyte can include other additives (e.g., a cosolvent or a redox chemical shuttle).

The electrochemical cells can be useful as rechargeable batteries and can be used in a variety of devices, including portable computers, tablet displays, personal digital assistants, mobile telephones, motorized devices (e.g., personal or household appliances and vehicles), instruments, illumination devices (e.g., flashlights) and heating devices. One or more of the electrochemical cells can be combined to provide battery pack.

Some Embodiments of the Disclosure

In a first embodiment, the present disclosure provides a copolymer comprising:
divalent units represented by formula —[$CF_2$—$CF_2$]—;
divalent units independently represented by formula:

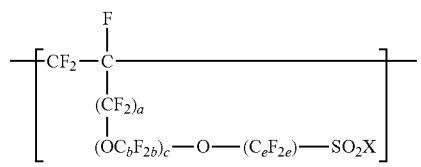

wherein a is 0 or 1, each b is independently 2 to 8, c is 0 to 2, e is 1 to 8, and each X is independently —F, —NZH, —NZ$SO_2$($CF_2$)$_{1-6}$$SO_2$X', —NZ[$SO_2$($CF_2$)$_d$$SO_2$NZ]$_{1-10}$$SO_2$($CF_2$)$_d$$SO_2$X', or —OZ, wherein Z is independently a hydrogen, alkyl having up to four carbon atoms, an alkali-metal cation, or a quaternary ammonium cation, X' is independently —NZH or —OZ, and each d is independently 1 to 6; and at least one divalent unit independently represented by formula:

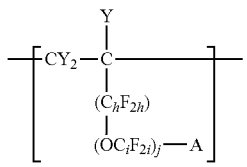

wherein A is —N(RF$^a$)$_2$ or a non-aromatic, 5- to 8-membered, perfluorinated ring comprising one or two nitrogen atoms in the ring and optionally comprising at least one oxygen atom in the ring, each RF$^a$ is independently linear or branched perfluoroalkyl having 1 to 8 carbon atoms and optionally interrupted by at least one catenated O or N atom, each Y is independently —H or —F, with the proviso that one Y may be —CF$_3$, h is 0, 1, or 2, each i is independently 2 to 8, and j is 0, 1, or 2.

In a second embodiment, the present disclosure provides the copolymer of the first embodiment, wherein b is 2 or 3, c is 0 or 1, and e is 4.

In a third embodiment, the present disclosure provides the copolymer of the first embodiment, wherein b is 2 or 3, c is 1, and e is 2 or 4.

In a fourth embodiment, the present disclosure provides the copolymer of any one of the first to third embodiments, wherein A is

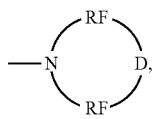

wherein each RF is independently perfluorinated alkylene having 2 to 4 carbon atoms, and D is a bond, —CF$_2$—, —O—, or —N-perfluoroalkyl.

In a fifth embodiment, the present disclosure provides the copolymer of any one of the first to fourth embodiments, wherein j is 1 or 2, and wherein A is

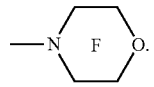

In a sixth embodiment, the present disclosure provides the copolymer of any one of the first to fifth embodiments, wherein A is N(RF$^a$)$_2$, wherein each Rfa is independently perfluoroalkyl having up to four carbon atoms.

In a seventh embodiment, the present disclosure provides the copolymer of any one of the first to sixth embodiments, wherein h is 0.

In an eighth embodiment, the present disclosure provides the copolymer of any one of the first to seventh embodiments, at least one of c is 1 or 2 or e is 3 to 8.

In a ninth embodiment, the present disclosure provides the copolymer of any one of the first to eighth embodiments, wherein a is 1.

In a tenth embodiment, the present disclosure provides the copolymer of any one of the first to eighth embodiments, wherein a is 0.

In a eleventh embodiment, the present disclosure provides the copolymer of any one of the first to tenth embodiments, wherein the copolymer further comprises at least one of divalent units derived from chlorotrifluoroethylene or divalent units derived from hexafluoropropylene.

In an twelfth embodiment, the present disclosure provides the copolymer of any one of the first to eleventh embodiments, wherein the copolymer has a T(α) of up to 105° C.

In a thirteenth embodiment, the present disclosure provides the copolymer of any one of the first to twelfth embodiments, wherein the copolymer further comprises divalent units independently represented by formula:

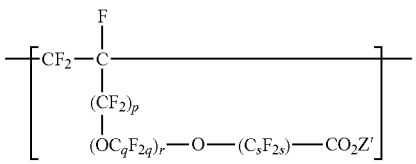

wherein p is 0 or 1, q is 2 to 8, r is 0 to 2, s is 1 to 8, and Z' is a hydrogen, an alkyl group having up to four carbon atoms, an alkali-metal cation or a quaternary ammonium cation.

In a fourteenth embodiment, the present disclosure provides the copolymer of any one of the first to thirteenth embodiments, wherein the divalent units comprise at least 60 mole % of —[CF$_2$—CF$_2$]—, based on the total amount of divalent units in the copolymer.

In a fifteenth embodiment, the present disclosure provides the copolymer of any one of the fourteenth embodiment, wherein at least a portion of X groups are —OZ.

In a sixteenth embodiment, the present disclosure provides the copolymer of the fifteenth embodiment, wherein Z is hydrogen In a seventeenth embodiment, the present disclosure provides the copolymer of the fifteenth embodiment, wherein Z is sodium.

In an eighteenth embodiment, the present disclosure provides the copolymer of any one of the first to seventeenth embodiments, wherein the copolymer has an —SO$_2$X equivalent weight in a range from 300 to 1200.

In a nineteenth embodiment, the present disclosure provides the copolymer of any one of the first to eighteenth embodiments, wherein the copolymer further comprises divalent units derived from at least one of ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, or hydroxybutyl vinyl ether.

In a twentieth embodiment, the present disclosure provides the copolymer of any one of the first to nineteenth embodiments, wherein the copolymer has up to 100 —COOM and —COF end groups per 10$^6$ carbon atoms, wherein M is independently an alkyl group, a hydrogen atom, a metallic cation, or a quaternary ammonium cation.

In a twenty-first embodiment, the present disclosure provides the copolymer of any one of the first to twentieth embodiments, wherein the copolymer comprises less than 25 ppm metal ions.

In a twenty-second embodiment, the present disclosure provides the copolymer of any one of the first to twenty-first embodiments, wherein the copolymer comprises —$SO_2X$ end groups.

In a twenty-third embodiment, the present disclosure provides the copolymer of any one of the first to twenty-second embodiments, wherein copolymer has a melt flow index of up to 40 grams per ten minutes measured at a temperature of 265° C. and at a support weight of 5 kg.

In a twenty-fourth embodiment, the present disclosure provides the copolymer of any one of the first to twenty-third embodiments, wherein the copolymer has a glass transition temperature of up to 20° C.

In a twenty-fifth embodiment, the present disclosure provides the copolymer of any one of the first to twenty-fourth embodiments, further comprising divalent units represented by formula

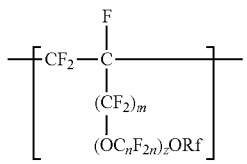

wherein Rf is a linear or branched perfluoroalkyl group having from 1 to 8 carbon atoms and optionally interrupted by one or more —O— groups, z is 0, 1, or 2, each n is independently 1, 2, 3, or 4, and m is 0 or 1.

In a twenty-sixth embodiment, the present disclosure provides the copolymer of the twenty-fifth embodiment, wherein when a is 0, then n is not 3.

In a twenty-seventh embodiment, the present disclosure provides the copolymer of the twenty-fifth or twenty-sixth embodiment, wherein z is 1 or 2, and n is 1, 2, or 3.

In a twenty-eighth embodiment, the present disclosure provides the copolymer of any one of the twenty-fifth to twenty-seventh embodiments, wherein at least one n is 1.

In a twenty-ninth embodiment, the present disclosure provides the copolymer of any one of the twenty-fifth to twenty-eighth embodiments, wherein the divalent units represented by formula

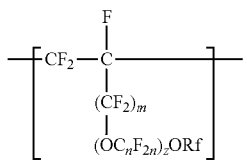

are present at up to 20 or up to 15 mole percent, or in a range from 3 to 20 or 4 to 15 mole percent, based on the total moles of divalent units in the copolymer.

In a thirtieth embodiment, the present disclosure provides the copolymer of any one of the first to twenty-ninth embodiments, wherein the divalent units represented by formula

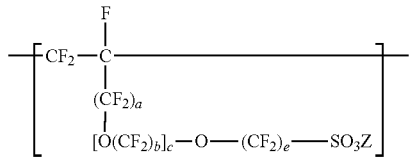

are present at up to 30 or up to 25 mole percent, or in a range from 10 to 30 or 15 to 25 mole percent, based on the total moles of divalent units in the copolymer.

In a thirty-first embodiment, the present disclosure provides a polymer electrolyte membrane comprising the copolymer of any one of the first to thirtieth embodiments.

In a thirty-second embodiment, the present disclosure provides the polymer electrolyte membrane of the thirty-first embodiment, wherein the polymer electrolyte membrane further comprises at least one of cerium cations, manganese cations, ruthenium cations, or a cerium oxide.

In a thirty-third embodiment, the present disclosure provides the polymer electrolyte membrane of the thirty-second embodiment, wherein the at least one of cerium cations, manganese cations, or ruthenium cations are present in a range from 0.2 to 20 percent relative to the amount of sulfonate groups in the copolymer.

In a thirty-fourth embodiment, the present disclosure provides a catalyst ink comprising the copolymer of any one of the first to thirtieth embodiments.

In a thirty-fifth embodiment, the present disclosure provides a membrane electrode assembly comprising at least one of the polymer electrolyte membrane of any one of the thirty-first to thirty-third embodiment or the catalyst ink of the thirty-fourth embodiment.

In a thirty-sixth embodiment, the present disclosure provides a binder for an electrode comprising the copolymer of any one of the first to thirtieth embodiments.

In a thirty-seventh embodiment, the present disclosure provides an electrochemical cell comprising the binder of the thirty-sixth embodiment.

In order that this disclosure can be more fully understood, the following examples are set forth. It should be understood that these examples are for illustrative purposes only and are not to be construed as limiting this disclosure in any manner.

EXAMPLES

All materials are commercially available, for example from Sigma-Aldrich Chemical Company, St. Louis, Mo., or known to those skilled in the art, unless otherwise stated or apparent.

The following abbreviations are used in this section: g=grams, L=liters, cm=centimeters, mm=millimeters, min=minutes, h=hours, NMR=nuclear magnetic resonance, ° C.=degrees Celsius, K=Kelvin, rpm=revolutions per minute, MPa=megaPascals. Abbreviations for materials used in this section, as well as descriptions of the materials, are provided in Table 1.

In the following examples, 2,2,3,3,5,5,6,6-octafluoro-4-[1,1,2,2,3,3,-hexafluoro-3-(1,2,2-trifluorovinyloxy)propyl] morpholine (MV3c4NO) was prepared generally as described in Example 2 of U.S. Pat. App. Pub. No. 2014/

0130713 (Costello et al.). $F_2C=CF-O-CF_2CF_2CF_2CF_2SO_2F$ (MV4S) was prepared according to the method described in U.S. Pat. No. 6,624,328 (Guerra). APS is ammonium persulfate, obtained from Sigma Aldrich. FE1 is a 30% aqueous solution of $CF_3-O-CF_2CF_2CF_2-O-CHFCF_2-COONH_4$ with 1.5 wt. % FC-70 added based on the weight of the $CF_3-O-CF_2CF_2CF_2-O-CHFCF_2-COONH_4$. $CF_3-O-CF_2CF_2CF_2-O-CHFCF_2-COONH_4$ was prepared as described in U.S. Pat. No. 7,671,112 (Hintzer, et al.). FC-70 is a fluid commercially available from 3M Company, St Paul, MN, under the trade designation "FLUORINERT FC-70."

Example 1

Part A
To a 1 L flask was added 355 g distilled water, 19 g FE1, 143 g MV4S, and 84 g MV3c4NO. An overhead stirrer equipped with a propeller blade was used to mix the liquid at approximately 200 rpm for approximately 15 min at room temperature. The resulting emulsion was used as prepared.
Part B
To a 4 L reactor was charged 2000 g distilled water. After bringing the liquid to a temperature of 65° C., charges of FE1 (48 g), APS (5.2 g), Part A (75 g), ammonium hydroxide (4.26 g of a 28% w/w aqueous solution), and additional distilled water (400 g) were added with stirring (450 rpm). Immediately following this addition, the vacuum was broken with nitrogen to a 0 psig (0 MPa). The reactor was subsequently pressured up with TFE until the reactor reached a pressure of 145 psig (1.10 MPa). Once at pressure, Part A (500 g) and TFE were added at a weight ratio of 4.76 (Part A:TFE). The reaction was run until 11.4% solids, stopped, and the latex was drained from the reactor. A portion of the resulting dispersion was coagulated by freezing and subsequent thawing, and the isolated solid polymer was dried for 16 h at 130° C. The equivalent weight was 983 as calculated from the equation, below.

Example 2

Part A
To a 1 L flask was added 355 g distilled water, 19 g FE1, 220 g MV4S, and 32 g MV3c4NO. An overhead stirrer equipped with a propeller blade was used to mix the liquid at approximately 200 rpm for approximately 15 min at room temperature. The resulting emulsion was used as prepared.
Part B
To a 4 L reactor was charged 2000 g distilled water. After bringing the liquid to a temperature of 65° C., charges of FE1 (48 g), APS (5.2 g), Part A (75 g), ammonium hydroxide (4.26 g of a 28% w/w aqueous solution), and additional distilled water (400 g) were added with stirring (450 rpm). Immediately following this addition, the vacuum was broken with nitrogen to a 0 psig (0 MPa). The reactor was subsequently pressured up with TFE until the reactor reached a pressure of 145 psig (1.10 MPa). Once at pressure, Part A (500 g) and TFE were added at a weight ratio of 3.12 (Part A:TFE). The reaction was run until 14.7% solids, stopped, and the latex was drained from the reactor. A portion of the resulting dispersion was coagulated by freezing and subsequent thawing, and the isolated solid polymer was dried for 16 h at 130° C. The equivalent weight was 822 as calculated from the equation, below.
Terpolymer Composition
$^{19}$F-NMR spectra were used to determine the composition of purified Example 1 and Example 2. Spectra were collected on the Varian 400 MHz NMRS solid-state NMR spectrometer (Varian Medical Systems; Palo Alto, CA, USA) equipped with a 3.2 mm Varian MAS probe at 17 kHz MAS at 180° C. Compositions are presented in Table 1.

TABLE 1

| Example 1 and 2 compositions | | | | |
|---|---|---|---|---|
| | Moles | Mole % | MW | Mass % |
| Example 1 | | | | |
| MV4S | 3.58 | 17 | 380.11 | 39 |
| TFE | 16.83 | 79 | 100.02 | 48 |
| MV3c4NO | 1 | 4.7 | 477.08 | 14 |
| Example 2 | | | | |
| MV4S | 10.3 | 20 | 380.11 | 46 |
| TFE | 40.8 | 78 | 100.02 | 48 |
| MV3c4NO | 1 | 1.9 | 477.08 | 5.6 |

Equivalent Weight (EW)
The EW of a copolymer of TFE, a sulfonyl fluoride monomer (M2), and nitrogen-containing monomer (M3) is calculated by the formula:

$$EW = \left(\frac{(\text{mol}\%TFE + (\text{molar mass }M3/\text{molar mass }TFE) \times \text{mol}\% \ M3)}{\text{mol}\%M2}\right) \times 100 + \text{molar mass }M2$$

Glass Transition Temperature
A TA Instruments Q2000 DSC can be used to measure the glass transition temperature (Tg) of the polymer samples. Samples can be heated on a temperature ramp from −50° C. to about 200° C. at 10° C. per min. Transition temperatures are analyzed on the second heats.
Oxygen Transmission Rate (OTR) Analysis
The coated film was masked to 5 cm² area (masked on both sides) with adhesive-backed aluminum masks (TM Electronics, Inc., Davens, Massachusetts, PML-800815) after cutting a 4 inch (10.2 cm) diameter circle sample with an AccuCut die and AccuCut MARK IV machine press (Omaha, NE) Masks were first applied to the film open-to-air side, keeping one side of the film against the release liner substrate that it was coated upon. A weighted roller was used to apply force on the mask to ensure a good seal around the perimeter of the active area of the sample. The release liner was then removed, and a second mask was applied aligned to the first mask, and a weighted roller was again used to ensure a good seal between the masks and sample. An oxygen permeation analyzer (8001L Oxygen Permeation Analyzer, Systech Illinois Instruments Company, Johnsburg, IL) was calibrated with 88.6 ppm $O_2$ in $N_2$ calibration gas (Oxygen Services Company, SG3 00LG025, certified, St. Paul, MN), or was calibrated against a film having a certified oxygen transmission rate (OTR) value. Masked samples were mounted into cells, running two samples per test, after applying vacuum grease (Apiezon, Manchester, UK) to the perimeter of each cell to ensure a good seal between the sample and the instrument nitrogen side. Ultra-high purity oxygen (99.996%, Oxygen Services Company, SG3 00MG003) test and ultra-high purity nitrogen (99.999%, Oxygen Services Company, NIT 304UHP) carrier gases were obtained from Oxygen Services Company. Measurements began after a tubing purge and leak check to ensure cells were properly sealed. Permeation rates were sampled at 20-minute intervals and the tests were stopped when a change of 1% or less in OTR was determined by the instrument between sampling intervals. OTR values were transformed from $$\frac{cc}{m^2 \text{ day}} \text{ to } \frac{mol \text{ cm}}{cm^2 \text{ s kPa}}$$

utilizing the thickness of the sample and 1 atm difference in partial pressure of oxygen from test to carrier gas side. Test temperature was designated per sample.

Film Coating Method

Films of material were coated using an Automatic Film Applicator (AFA) 1132N drawdown machine (TCQ Sheen, Metamora, MI) set at 50 mm/sec speed for a full-length coating distance. Upon the drawdown machine coating surface was placed a glass plate (12"×17"×⅛", 30.5 cm×43.2 cm×0.32 cm) and 2 mil (51 micrometer) silicone-coated PET release liner (7100, Loparex, Cary, NC) or 2 mil polytetrafluoroethylene sheets (TVF 002-R-24, Plastics International, Eden Prairie, MN). The glass and liner were cleaned of any debris with isopropyl alcohol (IPA). The release liner and plate were both secured under the drawdown mechanism by the built-in clip. A 4-inch (10.2 cm) milled coating notch bar square (Gardco, Paul N. Gardner Co., Pompano Beach, FL) was placed upon silicone-coated PET release liner, ionomer dispersion was poured in front of the notch bar, and the ionomer dispersion was coated at the set speed and distance. The release liner was taped at four corners so it would not lift in the forced air oven. The glass plate with release liner and coating was pulled from the drawdown machine, covered with an aluminum pan to prevent debris from falling into the coating, and placed upon ceramic supports in a Despatch forced air oven (Despatch, Minneapolis, MN) set at 120° C. for 30 minutes. The release liner and coating upon it were removed from the glass, placed into an aluminum pan, covered with another aluminum pan, and placed back into the oven for 15 minutes at a setting of 140° C. The temperature was ramped to 160° C. for a 10-minute hold. The film was cooled and characterized by micrometer measurement.

Dynamic Mechanical Analysis (DMA) for Talpha Determination

Elastic moduli of film samples in tension mode were measured using a TA Instruments DMA Q800 at 1 Hz (6.28 rad/sec). A membrane sample to be tested was vacuum dried at 50-60 C overnight and stored over molecular sieves in a closed vessel or desiccator until testing. The film was be removed from desiccator and quickly cut to desired geometry. A typical thin rectangular strip of sample approximately 6.7 mm wide and 30-60 um thick was mounted in the clamps and tightened with a length of approximately 6-10 mm. Preconditioning of the sample in the instrument included a temperature ramp from room temperature to 70° C. at 5 C/min, a 5 minute isothermal hold, and rapid ramp to between 20° C. and −50° C. with hold until equilibrium was reached. The analysis was conducted with 15 um amplitude strain at 1 Hz and 0.01 N pre-stress from the equilibrated temperature between 20° C. and −50° C. to a temperature in which the sample yielded, typically below 200° C. The Elastic modulus, E', and loss modulus, E", were measured. Talpha was determined at the maximum of tan-delta before yielding, the ratio of E"/E'.

Reagents:

Reagents including LiOH·$H_2O$(s) and $Li_2CO_3$(s) are available through Sigma-Aldrich.

| | |
|---|---|
| nPA | 1-propanol - A19902, Alfa Aesar, Ward Hill, MA |
| DI $H_2O$ | Deionized Water - Thermoscientific Barnstead GenPure system, 18.2 MOhm - Thermo Scientific, Asheville, NC |
| EtOH | Ethanol - V1001, Koptec 200 proof, Decon Labs Inc., King of Prussia, PA |
| Amberlite | Amberlite IR120 H+ ion exchange resin beads - Rohm and Haas, Lenntech, Miami Beach, FL |

Hydrolysis and Dispersion of Example 1:

175 g of Example 1 was added to a 2-gallon stirred pressure reactor (Parr Instrument Company, Moline, IL) with (30.8 g) LiOH·$H_2O$(s), (30.8 g) $Li_2CO_3$ (s), and 1500 g deionized water. The vessel was stirred and brought to 255° C. with a 1 hour hold and allowed to cool to room temperature with agitation. Dispersion obtained was filtered through 1 um glass fiber syringe filters (4524T, Pall Corporation, Port Washington, NY) and passed through a polycarbonate column (2.55 cm (r)×65 cm (h)) was filled approximately (2.4 mol acid sites) with Amberlite resin. This resin was washed with 20 L DI $H_2O$ prior to ion exchanging the polymer dispersion. Ionomer dispersion and system wash was passed over the resin in a single pass and collected pH 0-1 (colorimetric pH indicator strips, 8880-1, Ricca Chemical Co, Arlington, TX) dispersion. Collected the acidic polymer and dried in forced air oven to remove water at approximately 70° C. to obtain 112.3 g clear solids.

Coating Dispersion of Example 1:

A coating dispersion was prepared by dispersing approximately 9.4 g Example 1 in 13 g 60/40 nPA/$H_2O$ (w/w) solvent by rolling in a 125 mL plastic bottle with a stir bar for increased agitation until dispersed. Determined dispersion solids to be 39.16 wt % by gravimetric analysis after heating a small sample at 150 C for 10 minutes on an aluminum pan.

Film of Example 1

A film from coating dispersion of Example 1 was prepared according to the Film Coating Method above to obtain a film 34-39 um thick across the entire coating. This film was analyzed by the DMA for Talpha Method to determine a Talpha of 101.6° C. Another film 35-36 um thick was prepared and oxygen permeability was determined by the OTR Analysis method described above and determined the oxygen permeability to be $4.5181 \times 10^{-5}$ mol cm $cm^{-2}$ $s^{-1}$ $kpa^{-1}$.

Hydrolysis and Dispersion of Example 2:

250 g of Example 2 was added to a 4 L Parr stirred reactor with (44.3 g) LiOH·$H_2O$(s), (45.2 g) $Li_2CO_3$ (s), and 1500 g deionized water. The vessel was stirred and brought to 255° C. with a 1 hour hold and allowed to cool to room temperature with agitation. Dispersion obtained was filtered through 1 um glass fiber syringe filters (4524T, Pall Corporation, Port Washington, NY) and passed through a polycarbonate column (2.55 cm (r)×65 cm (h)) was filled approximately (2.4 mol acid sites) with Amberlite resin. This resin was washed with 20 L DI $H_2O$ prior to ion exchanging the polymer dispersion. Ionomer dispersion and system wash was passed over the resin in a single pass and collected pH 0-1 (colorimetric pH indicator strips, 8880-1, Ricca Chemical Co, Arlington, TX) dispersion. Collected the acidic aqueous polymer dispersion and dried in forced air oven upon PTFE sheeting-lined glass dish to remove water at approximately 70° C. to obtain 168.74 g clear solids.

Coating Dispersion of Example 2:

Dispersion was prepared by dispersing approximately 9 g Example 1 in 13 g 60/40 nPA/H$_2$O (w/w) solvent by rolling in a 125 mL plastic bottle with a stir bar for increased agitation until dispersed. Determined dispersion solids to be 39.48 wt % by gravimetric analysis after heating a small sample at 150° C. for 10 minutes on an aluminum pan.

Film of Example 2

A film from coating dispersion of Example 2 was prepared according to the Film Coating Method above to obtain a film approximately 57 um thick. This film was analyzed by the DMA for Talpha Method to determine a Talpha of 99.5° C. Another film 36 um thick was prepared and oxygen permeability was determined by the OTR Analysis method described above and determined the oxygen permeability to be 4.53256×10$^{-5}$ mol cm cm$^{-2}$ s$^{-1}$ kpa$^{-1}$.

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A copolymer comprising:
   divalent units represented by formula —[CF$_2$—CF$_2$]—;
   at least one divalent unit independently represented by formula:

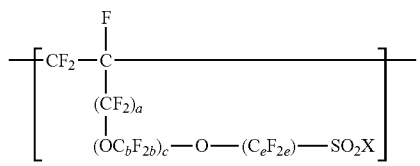

wherein a is 0 or 1, each b is independently 2 to 8, c is 0 to 2, e is 1 to 8, and each X is independently —F, —NZH, —NZSO$_2$(CF$_2$)$_{1-6}$SO$_2$X', —NZ[SO$_2$(CF$_2$)$_d$SO$_2$NZ]$_{1-10}$SO$_2$(CF$_2$)$_d$SO$_2$X', or —OZ, wherein Z is independently a hydrogen, alkyl having up to four carbon atoms, an alkali-metal cation, or a quaternary ammonium cation, X' is independently —NZH or —OZ, and each d is independently 1 to 6; and
   at least one divalent unit independently represented by formula:

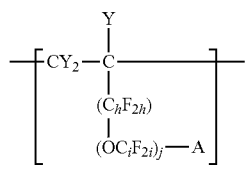

wherein A is —N(RF$^a$)$_2$ or a non-aromatic, 5- to 8-membered, perfluorinated ring comprising one or two nitrogen atoms in the ring and optionally comprising at least one oxygen atom in the ring, each RF$^a$ is independently linear or branched perfluoroalkyl having 1 to 8 carbon atoms and optionally interrupted by at least one catenated O or N atom, each Y is independently —H or —F, with the proviso that one Y may be —CF$_3$, h is 0, 1, or 2, each i is independently 2 to 8, and j is 0, 1, or 2.

2. The copolymer of claim 1, wherein b is 2 or 3, c is 0 or 1, and e is 2 to 4.

3. The copolymer of claim 1, wherein X is —F or —OZ.

4. The copolymer of claim 1, wherein A is

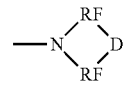

wherein each RF is independently perfluorinated alkylene having 2 to 4 carbon atoms, and D is a bond, —CF$_2$—, —O—, or —N-perfluoroalkyl.

5. The copolymer of claim 1, wherein j is 1 or 2, and wherein A is

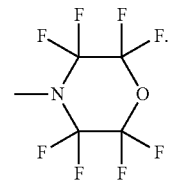

6. The copolymer of claim 1, wherein when Z is —F, the copolymer has a glass transition temperature of up to 20° C.

7. The copolymer of claim 1, further comprising at least one divalent unit represented by formula

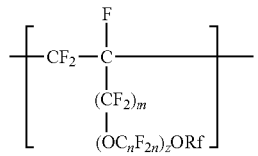

wherein Rf is a linear or branched perfluoroalkyl group having from 1 to 8 carbon atoms and optionally interrupted by one or more —O— groups, z is 0, 1, or 2, each n is independently 1, 2, 3, or 4, and m is 0 or 1.

8. The copolymer of claim 1, wherein the copolymer further comprises at least one of divalent units derived from chlorotrifluoroethylene or divalent units derived from hexafluoropropylene.

9. The copolymer of claim 1, wherein when Z is hydrogen, the copolymer has a T(a) of up to 105° C.

10. The copolymer of claim 1, wherein the copolymer has an —SO$_3$Z equivalent weight in a range from 300 to 1200.

11. The copolymer of claim 1, wherein the divalent units represented by formula

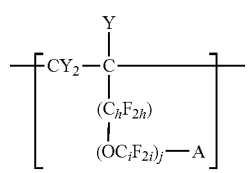

are present in a range from 0.5 to 20 mole percent, based on the total moles of divalent units in the copolymer.

12. The copolymer of claim 1, wherein the divalent units represented by formula

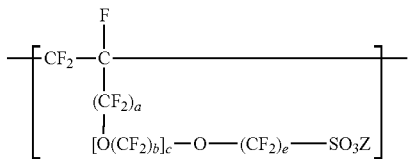

are present in a range from 10 to 30 mole percent, based on the total moles of divalent units in the copolymer.

13. The copolymer of claim 1, wherein at least one of c is 1 or 2 or e is 3 to 8.

14. The copolymer of claim 1, wherein A is $N(RF^a)_2$, wherein each Rfa is independently perfluoroalkyl having up to four carbon atoms.

15. The copolymer of claim 1, wherein the copolymer further comprises divalent units derived from at least one of ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, or hydroxybutyl vinyl ether.

16. The copolymer of claim 1, wherein the copolymer further comprises divalent units independently represented by formula:

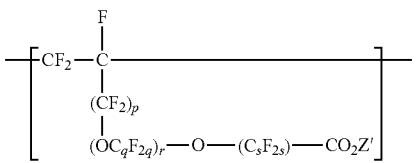

wherein p is 0 or 1, q is 2 to 8, r is 0 to 2, s is 1 to 8, and Z' is a hydrogen, an alkyl group having up to four carbon atoms, an alkali-metal cation or a quaternary ammonium cation.

17. A catalyst ink comprising the copolymer of claim 1.

18. A polymer electrolyte membrane prepared from the copolymer of claim 1.

19. A membrane electrode assembly comprising the catalyst ink of claim 17.

20. A membrane electrode assembly comprising the polymer electrolyte membrane of claim 18.

* * * * *

UNITED STATES PATENT AND TRADEMARK OFFICE
CERTIFICATE OF CORRECTION

| | | |
|---|---|---|
| PATENT NO. | : 12,034,193 B2 | Page 1 of 1 |
| APPLICATION NO. | : 17/782193 | |
| DATED | : July 9, 2024 | |
| INVENTOR(S) | : Lisa P. Chen | |

It is certified that error appears in the above-identified patent and that said Letters Patent is hereby corrected as shown below:

In the Claims

<u>Column 44</u>
Line 51, In Claim 9, delete "T(a)" and insert -- T(α) --, therefor.

Signed and Sealed this
Tenth Day of December, 2024

Katherine Kelly Vidal
*Director of the United States Patent and Trademark Office*